(12) United States Patent
Petrov et al.

(10) Patent No.: US 9,167,281 B2
(45) Date of Patent: Oct. 20, 2015

(54) TRANSPORT STREAM PACKET HEADER COMPRESSION

(75) Inventors: Mihail Petrov, Langen (DE); Frank Herrmann, Frankfurt (DE); Tomohiro Kimura, Osaka (JP); Mikihiro Ouchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 278 days.

(21) Appl. No.: 13/580,214

(22) PCT Filed: Feb. 24, 2011

(86) PCT No.: PCT/JP2011/001084
§ 371 (c)(1),
(2), (4) Date: Aug. 21, 2012

(87) PCT Pub. No.: WO2011/105097
PCT Pub. Date: Sep. 1, 2011

(65) Prior Publication Data
US 2012/0307842 A1 Dec. 6, 2012

(30) Foreign Application Priority Data

Feb. 26, 2010 (EP) ..................................... 10154898

(51) Int. Cl.
*H04N 21/23* (2011.01)
*H04N 21/236* (2011.01)
*H04L 12/861* (2013.01)
*H04N 21/2389* (2011.01)
(Continued)

(52) U.S. Cl.
CPC ...... *H04N 21/23608* (2013.01); *H04L 49/9057* (2013.01); *H04L 49/9094* (2013.01); *H04N 21/2389* (2013.01); *H04N 21/4385* (2013.01); *H04L 69/22* (2013.01)

(58) Field of Classification Search
CPC . H04L 49/9057; H04L 49/9094; H04L 69/22; H04N 21/23608; H04N 21/2389; H04N 21/4385
USPC ........... 370/465–477; 348/441, 445, 455, 469
See application file for complete search history.

(56) References Cited

U.S. PATENT DOCUMENTS

| 5,835,730 | A | 11/1998 | Grossman et al. |
| 6,618,397 | B1 * | 9/2003 | Huang .......................... 370/474 |

(Continued)

FOREIGN PATENT DOCUMENTS

| EP | 0 822 722 A2 | 2/1998 |
| EP | 1 751 955 | 3/2009 |

(Continued)

OTHER PUBLICATIONS

Australian Office Action issued Oct. 22, 2013 in AU Application No. 2011219325.
M.-J. Montpetit et al., "A Framework for Transmission of IP Datagrams over MPEG-2 Networks", IETF RFC4259, Nov. 2005, [retrieved from Internet], retrieved from <http://www.ietf.org/rfc/rfc4259.txt>.

(Continued)

*Primary Examiner* — Xavier S. Wong
(74) *Attorney, Agent, or Firm* — Wenderoth, Lind & Ponack, L.L.P.

(57) ABSTRACT

A demultiplexer 630 routes only one or more transport stream packets with a single packet identifier value to each physical layer pipe. A header compression unit 620 replaces the packet identifier of the transport stream packet with a short packet identifier of one bit length indicating at least whether the transport stream packet is a NULL packet.

5 Claims, 19 Drawing Sheets

(51) Int. Cl.
*H04N 21/4385* (2011.01)
*H04N 21/43* (2011.01)
*H04L 29/06* (2006.01)

(56) References Cited

U.S. PATENT DOCUMENTS

| | | | |
|---|---|---|---|
| 6,728,852 B1* | 4/2004 | Stoutamire | 711/170 |
| 7,328,283 B2 | 2/2008 | Tan et al. | |
| 2002/0028061 A1* | 3/2002 | Takeuchi et al. | 386/68 |
| 2002/0141365 A1* | 10/2002 | Leung | 370/335 |
| 2003/0026262 A1* | 2/2003 | Jarl | 370/394 |
| 2004/0033801 A1 | 2/2004 | Yi et al. | |
| 2004/0117498 A1* | 6/2004 | Hashimoto et al. | 709/230 |
| 2006/0104278 A1 | 5/2006 | Chang et al. | |
| 2006/0251074 A1* | 11/2006 | Solomon | 370/392 |
| 2007/0047551 A1 | 3/2007 | Conner et al. | |
| 2008/0212566 A1* | 9/2008 | Kim et al. | 370/352 |
| 2008/0279464 A1 | 11/2008 | Ahn et al. | |
| 2009/0041115 A1 | 2/2009 | Ramesh et al. | |
| 2009/0094356 A1 | 4/2009 | Vare | |
| 2009/0185534 A1 | 7/2009 | Barber et al. | |
| 2009/0245260 A1* | 10/2009 | Mohaban et al. | 370/392 |
| 2010/0172294 A1* | 7/2010 | Toyokawa | 370/328 |

FOREIGN PATENT DOCUMENTS

| | | |
|---|---|---|
| EP | 2 114 075 | 11/2009 |
| EP | 2 151 957 | 2/2010 |
| JP | 2002-325230 | 11/2002 |
| RU | 2289204 | 12/2006 |
| RU | 2007 117 917 | 11/2008 |
| TW | 200926800 | 6/2009 |

OTHER PUBLICATIONS

Russian Decision on Grant issued Dec. 16, 2013 in corresponding Russian Application No. RU 2012136217 along with English translation.

International Search Report issued Jun. 7, 2011 in corresponding International Application No. PCT/JP2011/001084.

"Digital Video Broadcasting (DVB); Frame structure channel coding and modulation for a second generation digital terrestrial television broadcasting system (DVB-T2)", European Standard (Telecommunications Series), European Telecommunications Standards Institute (ETSI), 650, Route Des Lucioles, F-06921 Sophia-Antipolis, France, No. V1.1.1, Jul. 1, 2009, pp. 2-167, XP014044393, cited in the application Figures 1-3, pp. 17-23.

ETSI EN 302 755 v1.1.1, "Digital Video Broadcasting (DVB); Frame structure channel coding and modulation for a second generation digital terrestrial television broadcasting system (DVB-T2)", Sep. 2009, pp. 2-167.

ETSI EN 300 744 v1.6.1, "Digital Video Broadcasting (DVB); Framing structure, channel coding and modulation for digital terrestrial television", Jan. 2009, pp. 2-66.

ISO/IEC 13818-1, Series H: Audiovisual and Multimedia Systems, Infrastructure of audiovisual services—Transmission multiplexing and synchronization, "Information technology—Generic coding of moving pictures and associated audio information: Systems", ITU-T Recommendation H.222.0, May 2006, pp. 1-174.

Decision on Grant of a Patent for Invention issued Apr. 15, 2015 in Russian Application No. 2014104578, with English translation.

Taiwanese Office Action issued Apr. 15, 2015, in Taiwanese Application No. 100106434 (with partial English translation).

* cited by examiner

Fig. 4

TS input: 410

| PID 1 | PID 2 | PID 3 | NULL | PID 4 | PID 1 | PID 2 | NULL | PID 3 | PID 4 | PID 1 | NULL | PID 2 | PID 3 | PID 4 | NULL | PID 1 | PID 2 | PID 3 | NULL | PID 4 | PID 1 | PID 2 |

After demultiplexing to PLPs:

PLP 1:
| PID 1 | NULL | NULL | NULL | NULL | PID 1 | NULL | NULL | NULL | NULL | PID 1 | NULL | NULL | NULL | NULL | NULL | PID 1 | NULL | NULL | NULL | NULL | PID 1 | NULL |

PLP 2:
| NULL | PID 2 | NULL | NULL | NULL | NULL | PID 2 | NULL | NULL | NULL | NULL | NULL | PID 2 | NULL | NULL | NULL | NULL | PID 2 | NULL | NULL | NULL | NULL | PID 2 |

PLP 3:
| NULL | NULL | PID 3 | NULL | NULL | NULL | NULL | NULL | PID 3 | NULL | NULL | NULL | NULL | PID 3 | NULL | NULL | NULL | NULL | PID 3 | NULL | NULL | NULL | NULL |

PLP 4:
| NULL | NULL | NULL | NULL | PID 4 | NULL | NULL | NULL | NULL | PID 4 | NULL | NULL | NULL | NULL | PID 4 | NULL | NULL | NULL | NULL | NULL | PID 4 | NULL | NULL |

NULL are not transmitted

TRANSPORT STREAM PACKET HEADER COMPRESSION

TECHNICAL FIELD

The present invention relates to compressing the header of transport stream packets for transmission over a digital broadcast network. In particular, the present invention relates to a reversible compression of the transport stream packet header.

BACKGROUND ART

Digital broadcast networks enable the unidirectional transmission of data such as audio, video, subtitling text, applications, etc. In broadcast networks, there is typically no return channel from the receiver to the transmitter and thus adaptive techniques cannot be employed. At present, there are several families of digital broadcast standards around the world. For instance, in Europe, Digital Video Broadcasting (DVB) standards have been adopted. In general, these standards define the physical layer and the data layer of the broadcast distribution system. The definition of the physical and data link layer depends on the transport medium, which can be for instance a satellite, cable, or terrestrial channel. Correspondingly, the family of DVB standards includes DVB-S and DVB-S2 for satellite transmission, DVB-C and DVB-C2 for cable transmission, DVB-T and DVB-T2 for terrestrial transmission, and DVB-H for terrestrial transmission to handheld devices.

The recent terrestrial digital broadcast standard DVB-T2 is an extended version of the widely used DVB-T standard. The specifications of these two standards can be found in Non Patent Literatures 1 and 2, respectively. Other than the DVB-T standard, the DVB-T2 standard introduces, for instance, the concept of physical layer pipes (PLP), provides new forward error correction schemes, modulation constellations, larger OFDM symbol sizes and more pilot configurations.

Video streams are typically encoded using a compression standard such as MPEG-2 or MPEG-4 part 10 (H.264) and encapsulated into an MPEG transport stream. Details on the MPEG transport stream (TS) can be found in Non Patent Literatures 3 and 4. These specifications define a mechanism for multiplexing and synchronization of audio, video and meta-data streams. In particular, the following functions are supported: (i) multiplexing of multiple streams in a constant bitrate stream, (ii) synchronization of the streams on decoding, and (iii) decoder buffer management.

In general, digital broadcast networks may carry multiple transport streams. Each transport stream may carry a multiplex of services (programs). Each service may be further composed of service components, which are transported in elementary streams.

For transmitting the coded stream of broadcast data over the broadcast network, the transport stream has a constant bitrate and may include several elementary streams such as audio, video, and data streams. The constant bitrate transport stream comprises fixed size packets carrying the data of the elementary streams and the signaling information necessary for identifying the programs and the program components within the transport stream. Such signaling data includes, for instance, program specific information (PSI) tables enabling the receiver/decoder to demultiplex the elementary streams. For instance, the MPEG transport stream specification defines a program association table (PAT) and a program mapping table (PMT). There is one PAT per transport stream multiplex. PAT provides the correspondence between each program, identified through a program number, and the packets carrying the PMT associated with that program. There is one PMT per program. The PMT provides the mapping between the program and its elementary streams and may contain program and elementary stream descriptors. In addition to the PSI tables defined by the transport stream specifications, further tables are defined by various digital broadcasting standards supporting transport streams. In the DVB family of standards they are referred to as system information (SI) tables. Some system information tables are mandatory in DVB standards, for instance, the network information table (NIT) conveying information regarding the digital broadcast network and the physical organization of the transport streams carried.

FIG. 1 illustrates the format of a transport stream packet 110. The transport stream packet 110 contains a 4-byte header 120 and a 184-byte payload 130. The 4-byte header 120 includes 8 bits for a synchronization sequence 121, one bit for a transport error indicator 122, one bit for a payload unit start indicator 123, one bit for transport priority 124, 13 bits for a packet identifier (PID) 125, 2 bits for transport scrambling control 126, 2 bits for adaptation field control 127, and 4 bits for a continuity counter 128.

The synchronization byte (sync byte) 121 is a fixed sequence of 8 bits with a value "01000111" (0x47). This sequence is used to detect the boundaries between packets in systems that have no other means of signaling them.

The transport error indicator 122 is typically set at the receiver by the demodulator when the error correction mechanism fails in order to indicate to the decoder that the packet is corrupt. The payload unit start indicator 123 indicates that a new packetized elementary stream packet or a PSI/SI table starts in that transport stream packet. The transport priority indicator 124 enables higher and lower priority packets to be distinguished among packets with the same packet identifier (PID).

The PID field 125 identifies the data source of the transport stream packet. Each transport stream packet may only carry data from a single elementary stream or PSI/SI table. Each elementary stream and PSI/SI table is uniquely associated with a PID. Thus, the PID field is used by the decoder to extract the PSI/SI tables and the desired elementary streams from the multiplexed transport stream. The PID values from 0x0000 to 0x000F are reserved. The PID value of 0x1FFF indicates NULL packets. The NULL packets are a special type of stuffing packets, which carry no data but are needed, for instance, for asynchronously multiplexing the elementary streams and PSI/SI tables into a constant-bitrate transport stream.

The transport scrambling control 126 signalizes whether and what kind of scrambling is applied. The adaptation field control 127 indicates whether there is an adaptation field and/or payload in the transport stream packet.

The continuity counter 128 is a transport stream packet sequence number. The value of the continuity counter is incremented for each transport stream packet with the same PID. The transport stream syntax allows the transmission of duplicated packets and the continuity counter enables the identification of such duplicated packets having the same PID by assigning to the duplicated packets the same continuity counter value. Here, the "duplicated packet" means a repetition of a previous packet with the same ID value. The continuity counter counts modulo 16, i.e., it rolls over to zero after reaching its maximum value 15.

In general, digital video broadcast networks may carry multiple transport streams. Each transport stream may carry a multiplex of digital video broadcast services (programs).

Each service may be further composed of service components, which are transported in elementary streams wherein an elementary stream is identified by the packet identifier PID. All transport stream packets belonging to the same elementary stream have the same PID value. The broadcast service may be, for instance, a TV program, which may include one or more audio components and one or more video components. The multiple audio components may carry speech in different languages. Alternatively, the multiple audio components and the multiple video components may carry the same audio and video content respectively, but coded with different robustness levels.

The synchronization byte in the transport stream packet header is only transmitted in systems whose underlying layers do not have any means for distinguishing the boundaries between packets. However, in systems where such means are available, such as DVB-T2, the synchronization byte is not transmitted. In some other cases, further signaling fields may become redundant since they can be derived, for instance, from signaling information provided in the lower layers. Transmitting such signaling fields unnecessarily reduces the efficiency of the digital broadcast network.

CITATION LIST

Non Patent Literature

[NPL 1] ETSI standard EN 302 755, "Frame Structure Channel Coding and Modulation for a Second Generation Digital Terrestrial Television Broadcasting System (DVB-T2)"

[NPL 2] ETSI standard ETS 300 744, "Digital Broadcasting Systems for Television, Sound and Data Services: Frame Instructor, Channel Coding and Modulation for Digital Terrestrial Television"

[NPL 3] ISO/IEC 13818-1, "Generic Coding of Moving Pictures and Associated Audio Information Systems"

[NPL 4] ITU Recommendation H.222.0, "Generic coding of moving Pictures and Associated Audio information: Systems"

SUMMARY OF INVENTION

The aim of the present invention is to achieve an efficient transmission and reception of digital broadcast data in a digital broadcast network by means of compressing the header of the transport stream packets. This is achieved by the features as set forth in the independent Claims. Preferred embodiments of the present invention are the subject matter of the dependent Claims.

It is the particular approach of the present invention to replace at a transmitter side a packet identifier field in the header of a transport stream packet, mapped according to the packet identifier to a particular physical layer pipe, with a shorter field called, for instance, short packet identifier, which can be as short as one bit. It is also a particular approach of the present invention to restore correspondingly at the receiver side the packet identifier by replacing said short packet identifier with the original packet identifier.

Replacing the original full-length packet identifier with the shorter packet identifier reduces the number of header bits sent for each transport stream packet, which enables a more efficient resource utilization in the digital broadcast system.

In accordance with a first aspect of the present invention, a method is provided for transmitting, in a digital broadcast network, digital broadcast data in the form of fixed length transport stream packets. The method includes identifying a header of a transport stream packet, wherein said header includes a packet identifier of a predefined length of more than one bit. The transport stream packet is routed to a physical layer pipe in accordance with a predefined mapping showing a correspondence between packet identifier values and one or more physical layer pipes, wherein in the mapping, only one or more transport stream packets with a single packet identifier value are routed to each of the physical layer pipes. The packet identifier of said transport stream packet is replaced with a one-bit short packet identifier. The said short packet identifier indicates whether the packet is a NULL packet or a data packet.

The packet identifier field PID has typically a length of 13 bits. Based on its PID value, the transport stream packet is mapped to a physical layer pipe according to a predefined mapping table, which is signaled to the receiver. Packets mapped to other PLPs are advantageously replaced with NULL packets. Hereby, the existing NULL packets are preserved in all PLPs.

If a PLP contains only packets with a single PID, the short packet identifier can be as short as one bit since it needs to distinguish between NULL packets and one type of data packets. In this case the short packet identifier can be alternatively referred to as NULL-packet indicator.

In accordance with another aspect of the present invention, an apparatus is provided for transmitting digital broadcast data in a digital broadcast network in the form of fixed-length transport stream packets. The apparatus comprises an extracting unit for identifying a header of a transport stream packet, wherein the header includes a packet identifier of a predefined length which is more than one bit. The apparatus further comprises a demultiplexer for routing said transport stream packet to a physical layer pipe in accordance with a predefined mapping showing a correspondence between packet identifier values and one or more physical layer pipes, wherein in the mapping, only one or more transport stream packets with a single packet identifier value are routed to each of the physical layer pipes. The apparatus further comprises a header compression unit for replacing the packet identifier in the header of said transport stream packet with a one-bit short packet identifier. The short packet identifier indicates at least whether said transport stream packet is a NULL packet.

The value of the packet identifier (PID field) indicates the source of the data included in the transport stream packet. The source of data is either an elementary stream or a PSI/SI table. All transport stream packets belonging to the same elementary stream or PSI/SI table have the same PID value. The PSI/SI tables signal information related to the transport stream and the system in which it is carried. The information contained in the PSI tables, for example, describes the data multiplexed in the transport stream, which allow the individual elementary streams in the transport stream to be correctly demultiplexed in the receiver.

The term "NULL packet" refers to a transport stream packet which contains no information and is not transmitted. The NULL packets may be present in a transport stream, for instance, in order to preserve the information about the relative position of the data packets.

Replacing the 13-bit PID field with a one-bit short PID (NULL packet indicator) reduces the length of the transport stream packet header while still allowing distinguishing between NULL packets and data packets. The essential condition is that all data packets have the same PID. Identifying the NULL packets is important for allowing their insertion at the receiver according to signaled information.

At the receiver, the short PID is replaced with the original 13-bit PID. If the short PID indicates a NULL packet, then the PID takes the predetermined packet identifier value for NULL packets, 0x1FFF.

The transport stream packet header further includes a continuity counter, which indicates a sequence number of the transport stream packet within an elementary stream. The continuity counter has typically 4 bits.

According to an embodiment of the present invention, the continuity counter is replaced with a preferably one-bit duplicated packet indicator, which indicates whether the transport stream packet is a repetition of the previous packet with the same PID value. This substitution further reduces the length of the transport stream packet header while still allowing the identification of duplicated packets. The substitution is possible because transport stream packets cannot be lost or reordered in a digital broadcast transmission.

The transport stream packet header further includes a one-bit transport error indicator for signaling whether an unrecoverable error has occurred during the transmission of the transport stream packet.

In accordance with another embodiment of the present invention, the transport error indicator is deleted from the transport stream packet header at the transmitter. Deleting the transport error indicator further reduces the packet header length. The transport error indicator can be removed because it is set at the receiving side by the demodulator.

In accordance with still another aspect of the present invention, a method is provided for receiving digital broadcast data in a digital broadcast network in the form of fixed length transport stream packets. A transport stream packet is extracted from a receiving physical layer pipe and its header is identified. In accordance with a mapping showing a correspondence between packet identifier values and one or more physical layer pipes, a value of a packet identifier of the extracted transport stream packet is determined, wherein the packet identifier has a predefined length of a plurality of bits. In the header of the extracted transport stream packet, a short packet identifier, which indicates at least whether the packet is a NULL packet, is replaced with the determined original packet identifier which is longer than the short packet identifier.

Preferably, the short packet identifier is a one-bit NULL-packet indicator. If the NULL-packet indicator is not set, then the NULL-packet indicator in the header of the received packet is replaced with said original 13-bit PID. If the NULL-packet indicator is set, the NULL-packet indicator is replaced with the predefined 13-bit PID for NULL packets (1_1111_1111_1111, or 0x1FFF, specified in the transport stream specification).

In accordance with yet another aspect of the present invention, an apparatus for receiving in a digital broadcast network digital broadcast data in the form of fixed-length transport stream packets is provided. The receiving apparatus comprises an extracting unit for identifying a header of a transport stream packet extracted from a receiving physical layer pipe. The apparatus further comprises a header-deriving unit for determining, in accordance with a mapping showing a correspondence between packet identifier values and one or more physical layer pipes, a packet identifier value of the extracted transport stream packet. The packet identifier value has a predefined length of a plurality of bits. The receiving apparatus further comprises a header-decompressing unit capable of replacing, in the header of the extracted transport stream packet, a short packet identifier, which indicates at least whether the packet is a NULL packet, with a determined packet identifier which is longer than the short packet identifier.

The receiving method preferably comprises determining a value of the continuity counter, having typically a length of 4 bits. The determined continuity counter is advantageously used to replace a one-bit duplicated packet indicator in the header of a received transport stream packet.

In accordance with another embodiment of the present invention, a transport error indicator may be inserted into the header of the received transport stream packet. The value of the transport error indicator may be set in accordance with the result of the forward error correction performed at the receiver.

In accordance with an advantageous embodiment of the present invention, the packet identifier has a length of 13 bits and is compressed to a one-bit NULL-packet indicator. The continuity counter has a length of 4 bits and is replaced with a one-bit duplicated packet indicator. The transport error indicator is removed. Preferably, the 8-bit synchronization sequence (sync byte) is also deleted.

By replacing the packet identifier and the continuity counter and by removing the transport error indicator the length of the transport stream packet header is reduced by up to two bytes. If the sync byte is not transmitted the resulting header length is as low as one byte.

In accordance with yet another embodiment of the present invention, a header compression indicator is signaled for each physical layer pipe. The header compression indicator indicates whether the header of the transport stream packets transmitted in each physical layer pipe is compressed using any of the above header compression methods. Preferably, the header compression indicator is included in the PLP loop, which is part of the Layer-1 signaling (physical layer signaling). Alternatively, the header compression indicator may be signaled within a header of the corresponding packets in which the transport stream packets are encapsulated, such as, for instance, baseband frames (as in the case of DVB-T2). This allows both compressed and uncompressed header transport stream packets to be supported simultaneously in the same system.

In accordance with another aspect of the present invention, a computer-readable medium having a computer-readable program code embodied thereon is provided, the program code being adapted to carry out the present invention.

In accordance with still another aspect of the present invention, a system for transferring digital broadcast data from a transmitting side to a receiving side is provided, comprising a transmitting apparatus as described above, a broadcast channel and a receiving apparatus as described above. The broadcast channel may be formed by any media such as cable, satellite channel, terrestrial wireless channel, etc. The receiving apparatus may be a digital television, a set top box, a personal computer or a portable computer equipped with a digital broadcast receiver, a handheld device or any other device.

The above objectives and other objectives and features of the present invention will become more apparent from the following description and preferred embodiments, given in conjunction with the accompanying drawings.

BRIEF DESCRIPTION OF DRAWINGS

FIG. 4 is a schematic drawing illustrating the use of NULL packets in a transport stream, before and after the mapping to the physical layer pipes.

DESCRIPTION OF EMBODIMENTS

The present invention enables the compression of the transport stream packet header in order to increase the transmission efficiency in a digital broadcast network.

The method/apparatus of the present invention can be applied to MPEG transport stream packets transmitted over a broadcast network. The method/apparatus can reduce the size of a transport stream packet by up to two bytes. This is achieved by replacing and/or removing some fields in the transport stream packet header. The compression is lossless (reversible) and is performed on the transmitter side. Correspondingly, on the receiver side, the original packet headers can be restored using signaling information transmitted alongside the actual data.

Figure 1:
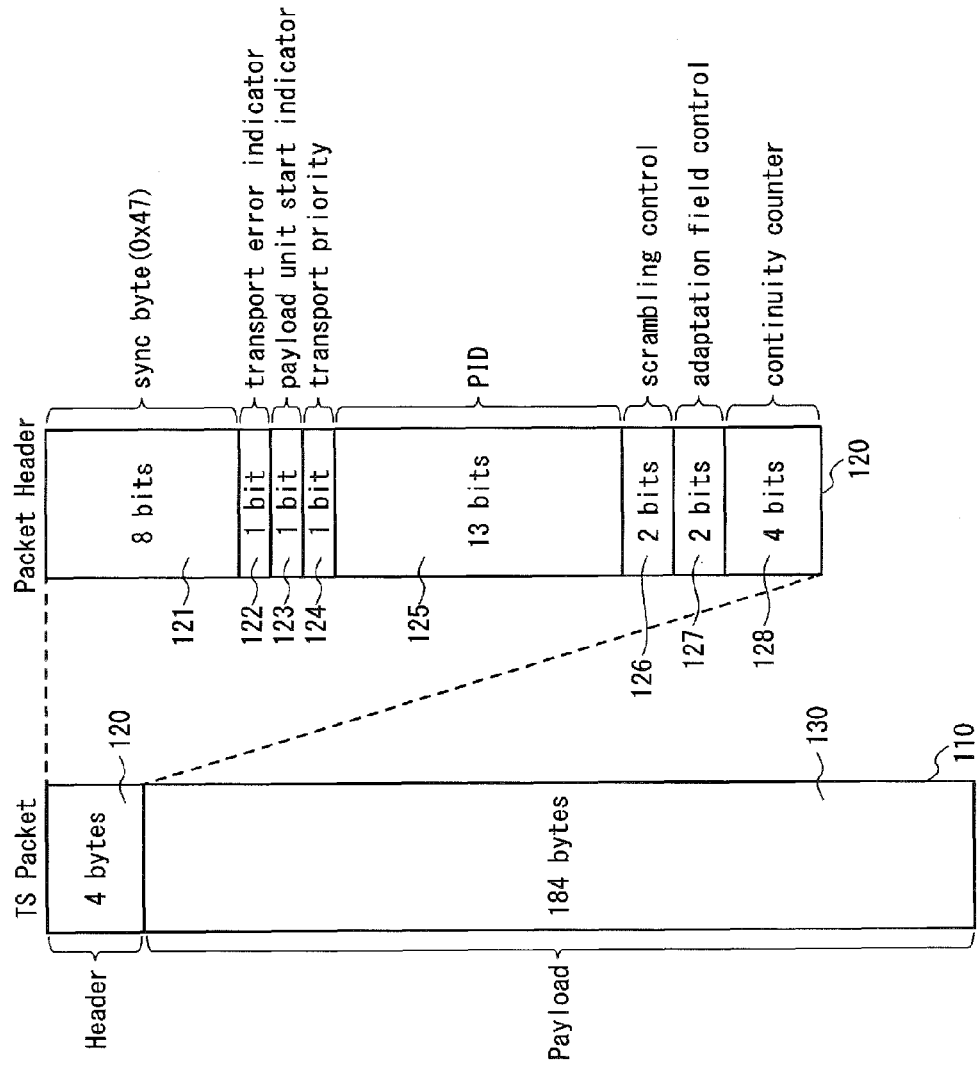
FIG. 1 is a schematic drawing illustrating the fixed format of the transport stream packet and its header in accordance with the MPEG transport stream specification.

As shown in FIG. 1, the longest field of a transport stream packet header 120 is the 13-bit packet identifier PID 125. The PID field indicates the source of the data carried by said transport stream packet. In the context of digital broadcasting, the source of the data may be, for instance, a particular elementary stream, or a table containing program specific information or system information (PSI/SI table). The PSI tables contain information needed by the receiver to correctly demultiplex the elementary streams of the programs in the transport stream multiplex. The PID may be reduced in length if the underlying system enables a corresponding identification of the data source.

Some systems, for instance, the recent standard DVB-T2, employ the concept of physical layer pipes (PLP). The physical layer pipes allow multiple parallel data streams to be multiplexed at the physical layer. The processing for the multiple data streams may be configured separately by means of selecting, for example, a forward error correction (FEC) coding rate, modulation constellation size, interleaving length and other physical layer parameters. The separate configurability of the physical layer pipes enables the provision of different robustness levels for each individual physical layer pipe.

Figure 2:
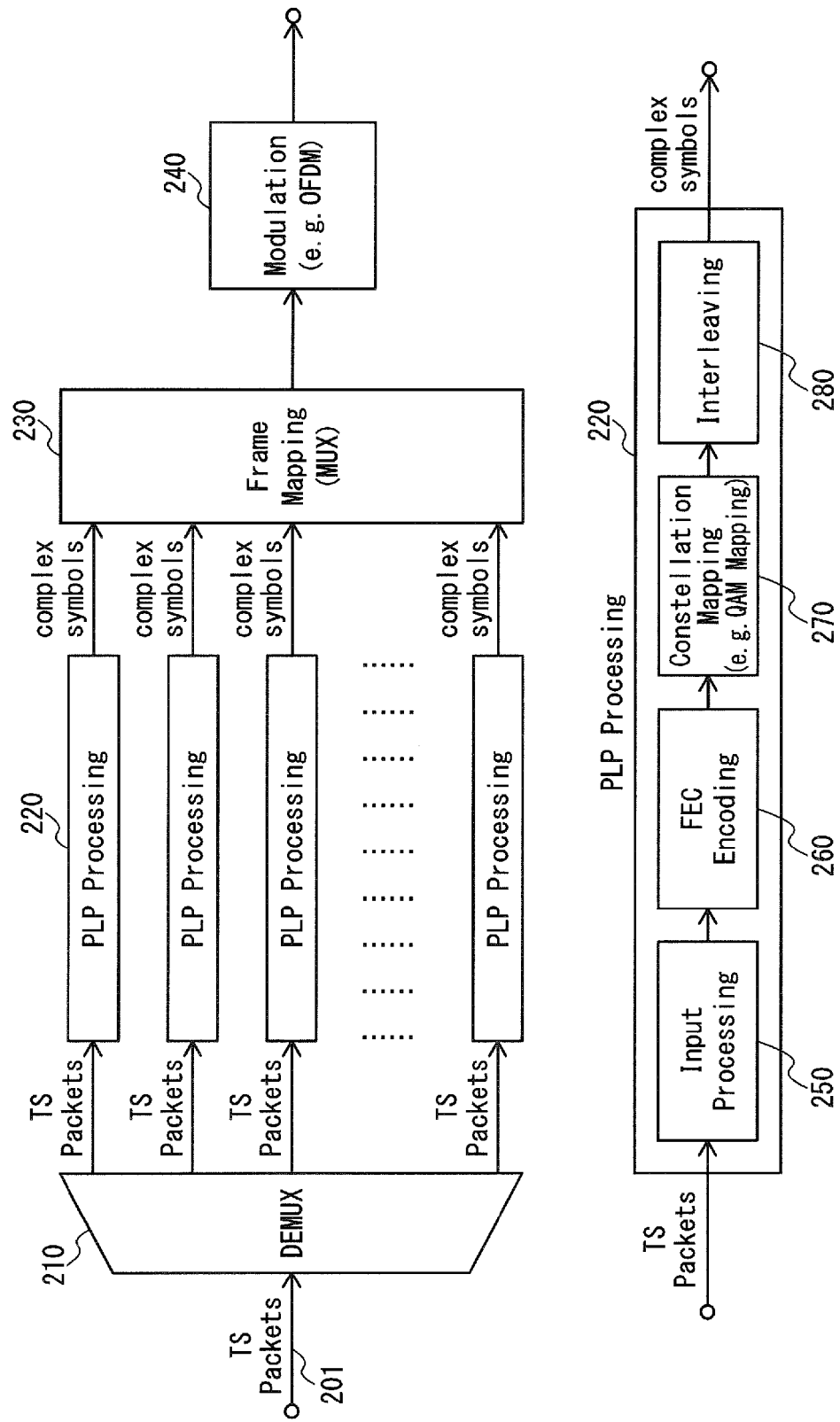
FIG. 2 is a block diagram illustrating the physical layer pipe concept as used in the DVB-T2 standard.

FIG. 2 schematically illustrates the conventional transmitter side that utilizes physical layer pipes such as, for instance a DVB-T2 transmitter. The transport stream containing fixed size packets 201 is input to a demultiplexer 210. According to the packet identifier PID 125, in the demultiplexer the transport stream packets are routed (mapped) to the respective physical layer pipes 220 and further processed. The mapping between the PIDs 125 and the PLPs 220 is fixed, i.e., does not change during the transmission, and is signaled from the transmitter to the receiver using dedicated signaling resources (fields). The multiple physical layer pipes 220 may be processed in parallel.

In digital broadcasting systems that use physical layer pipes, each service (program) can be transmitted in its own physical layer pipe. This enables reducing the amount of data that must be demodulated at the receiver when assuming that only one service is consumed at a time, since the receiver only needs to demodulate the data carried in the corresponding single physical layer pipe.

The physical layer pipe processing 220 includes an input processing 250, a forward error correction (FEC) encoding 260, a constellation mapping 270, and an interleaving 280. Within the input processing 250, the transport stream packets are transformed into an appropriately formatted bitstream which is then encoded and mapped on the physical layer resources. The basic data structure at the physical layer is known as a baseband frame. The input processing 250 transforms transport stream packets into baseband frames, which, together with the parity bytes generated by the forward error correction (FEC) code, further build coded FEC blocks. Baseband frames have a fixed length which depends on the particular FEC coding used.

Figure 3:
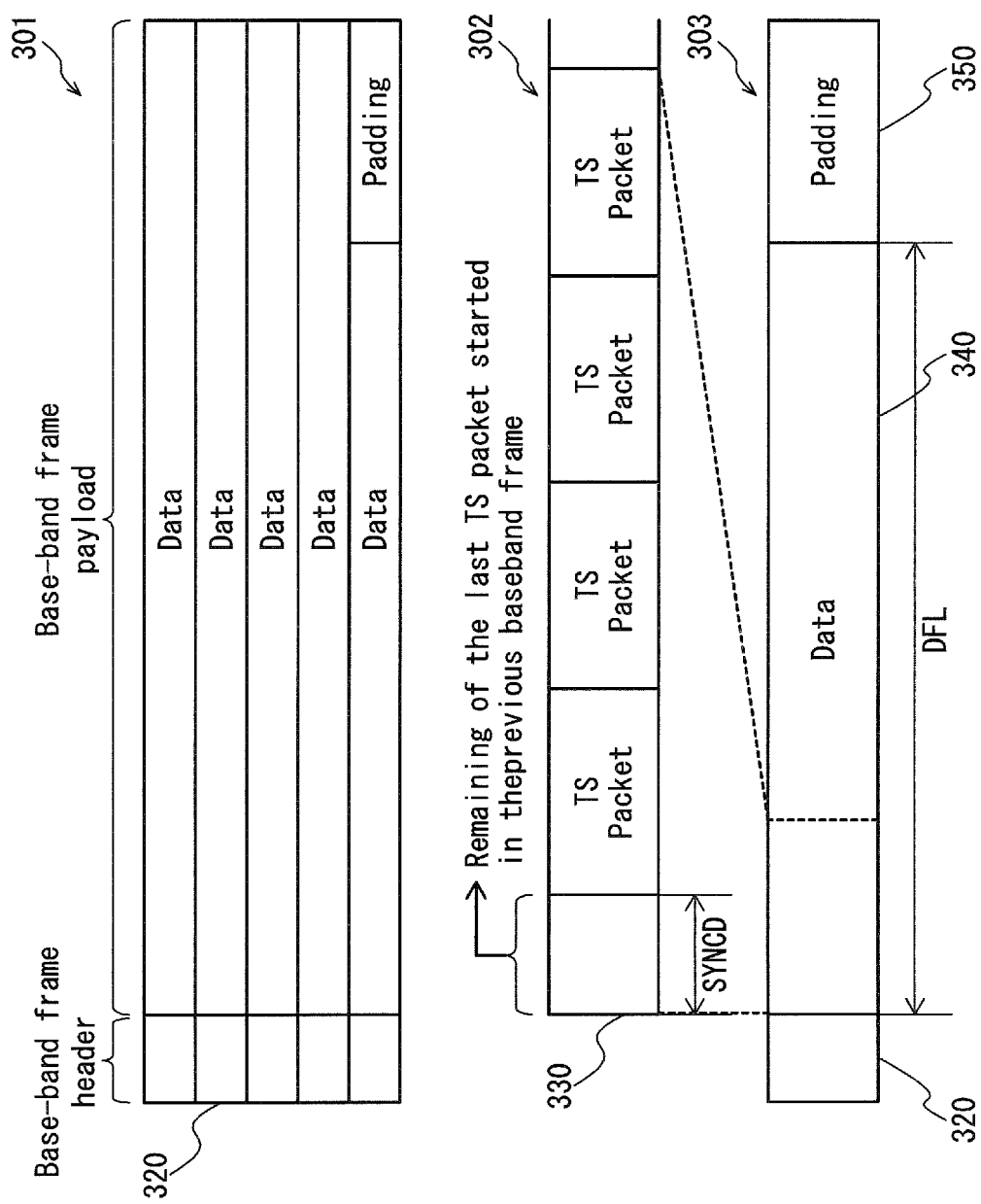
FIG. 3 is a schematic drawing illustrating the format of a baseband frame for a DVB-T2 system.

FIG. 3 illustrates a baseband frame 303, such as can be found also in DVB-T2, with a header 320, data field 340, and padding 350. Each baseband frame has a fixed-size header 320 containing signaling information required for identifying the boundaries of the transport stream packets encapsulated in the baseband frame payload. The header of the baseband frame includes, for example a so-called SYNCD field, which indicates the offset from the beginning of the baseband packet payload 340 to the start of the first complete transport stream packet in the baseband packet payload. This is illustrated in FIG. 3 as a portion 302 of the baseband data 340, the portion 302 of the data including a remainder 330 of the last transport stream packet, which have possibly started in the previous baseband frame, the remainder 330 having the length specified by the SYNCD value. The portion 302 of the data 340 further includes a plurality of transport stream packets 110, not necessarily an integer number.

The header 320 of the baseband frame 303 further includes a data field length (DFL) indicator, which indicates the length (number of bytes) of the baseband frame payload 340 occupied by the actual data. The remaining bytes to the end of the fixed size baseband frame 303 are padding bytes 350. The data field length is required in order to distinguish the payload 340 from the padding 350 within the baseband frame. Padding 350 is necessary since the payload data (transport stream packets) usually do not fill completely the last baseband frame as exemplified in a burst 301 including five baseband frames.

In each physical layer transmission frame, an integer number of baseband frames are transmitted. A baseband frame is also a FEC (forward error correction) block. Typical block FEC coding schemes include LDPC and BCH, as also used in DVB-T2. This results in adding to each baseband frame parity bits, the amount of which is given by the chosen FEC coding rate.

The constellation mapping 270 refers to applying a modulation to the encoded FEC blocks, thereby producing complex symbols. Typically, this is a QAM modulation such as 16, 64 or 256 QAM. Finally, the complex symbols generated by the constellation mapping 270 are frequency-interleaved and/or time-interleaved by the interleaving 280 in order to improve the frequency and/or time diversity. The interleaved complex symbols from the different physical layer pipes are then mapped 230 onto physical layer frames. The physical layer frames are then modulated 240 using, for instance, orthogonal frequency division multiplexing (OFDM) and provided for transmission in the digital broadcast network. The parameters for the above processing steps are signaled to the receiver as part of the Layer-1 signaling (physical layer signaling).

Since the signaling at the lower layers allows for the identification of the first transport stream packet in the baseband frame, the receiver is able to extract the packets correctly, the sync byte does not need to be transmitted in the system described above.

Regarding the mapping of the packets to physical layer pipes (PID-to-PLP mapping), transport stream packets with the same PID are mapped to the same PLP. However, a PLP may, in general, carry transport stream packets with multiple different PIDs. The mapping of the PIDs to PLPs is fixed, i.e., it does not change dynamically during the transmission. The two extreme mapping cases are:

(i) all TS packets are carried in a single PLP regardless of their PID, and (ii) each PID is carried in its own PLP.

In most cases, a real system will contain PLPs that carry packets with different PID values, as well as PLPs that carry packets with only one PID.

According to the present invention, only transport stream packets with the same PID value are mapped to one PLP. If a PLP carries packets with only one PID value, the PID field in each packet does not need to be transmitted as it contains no information. The transmitter transmits a mapping (PID-to-PLP mapping) table showing a correspondence between PIDs value and one or more PLPs. Its value can be restored at the receiver from a fixed PID-to-PLP mapping table signaled by the transmitter. For instance, such a system may carry all PSI/SI packets in one common PLP, and each program component (elementary stream) in its own separate PLP.

Also, if the transmitter and the receiver share a predefined fixed mapping (PID-to-PLP mapping) method, the receiver can restore the PID value with no need of transmission of the PID-to-PLP mapping table from the transmitter to the receiver.

As described above, even if a PLP carries packets with only one PID, NULL packets are still present in order to preserve the original packet positions. The NULL packets have a predefined PID of 0x1FFF (all ones). NULL packets are stuffing packets that carry no information but are needed for multiplexing variable-bitrate elementary streams into the constant-bitrate transport stream. In order to allow the timestamps generated in the transmitter to retain their meaning in the receiver, the transport stream system model requires a constant end-to-end delay through the chain composed of modulator, channel, and demodulator. The time stamps are critical for the relative synchronization of the service components.

FIG. 4 shows the mapping of the transport stream (TS) packets to PLPs according to their PID in the present invention. Packets that are mapped to a particular PLP are replaced with NULL packets in all the other PLPs that carry packets belonging to the same transport stream. The NULL packets are needed for preserving the bitrate of the original transport stream in all PLPs that carry packets from that transport stream. In the figure, PID 1 through 4 denote transport stream packets with a first, second, third, and fourth value of the PID respectively. Transport packets labeled as NULL are NULL packets 410. Since the NULL packets 410 contain no information, they do not need to be transmitted. Their presence, however, must be signaled so that they can be reinserted at the original positions at the receiver. This ensures that the relative position of the transport stream packets is not affected, so the end-to-end delay remains constant.

In DVB-T2 the NULL packets are deleted before they are transmitted, but the number of contiguous NULL packets deleted is signaled using a special byte after each data packet. If a run of more than 255 contiguous NULL packets occurs, the $256^{th}$ NULL packet will be transmitted. Therefore, even after the NULL packet deletion step, NULL packets may still exist.

In view of the above NULL packet deletion mechanism, even if a PLP carries only TS packets of a single PID, it is still necessary to distinguish NULL packets from data packets. Therefore, according to the present invention, the original 13-bit PID field is not completely removed, but rather replaced with a short PID, which is shorter than the original 13-bit PID and indicates at least whether the packet is a NULL packet. Alternatively to indicating NULL packets, the short PID may indicate a shortened PID in the case where multiple PIDs are carried in one PLP. Here, the shortened PID means the original PID that has been shortened based on a predefined mapping table. The shortened PID is restored to the original PID at the receiver based on the predefined mapping table.

The mapping between the original PID and the short PID may then be signaled to the receiver through a dedicated table.

In the case where only one PID (e.g. elementary stream) is transported by a single PLP, the short packet identifier is preferably a one-bit NULL-packet indicator signaling whether the packet is a NULL packet.

In order to save even more packet header bits, in accordance with an embodiment of the present invention the 4-bit continuity counter can also be discarded since transport stream packets cannot be lost or reordered within the physical layer pipe. However, since the continuity counter can also identify duplicated packets by labeling them with the same continuity counter value, one bit is still needed in order to indicate if a packet is duplicated. According to this embodiment of the present invention, the 4-bit continuity counter is replaced with a one-bit duplicated packet indicator. At the receiver, the continuity counter field may be restored again to its full length.

In order to save one more bit, in accordance with another embodiment of the present invention, the one-bit transport error indicator is removed from the TS packet header. This may be done since the transport error indicator is set at the receiver. When replacing the packet identifier and the continuity counter with a respective one-bit indicator and removing the transport error indicator, 12+3+1=16 bits, i.e. exactly two bytes may be saved for each transport stream packet. This is a half of the packet header length. Moreover, as already described above, the sync byte may be removed as well. Consequently, in accordance with the present invention, the header size of a transport stream packet may be reduced from four bytes to only one byte. Such a reduction enables more efficient utilization of the resources in a digital broadcast network.

Figure 5:
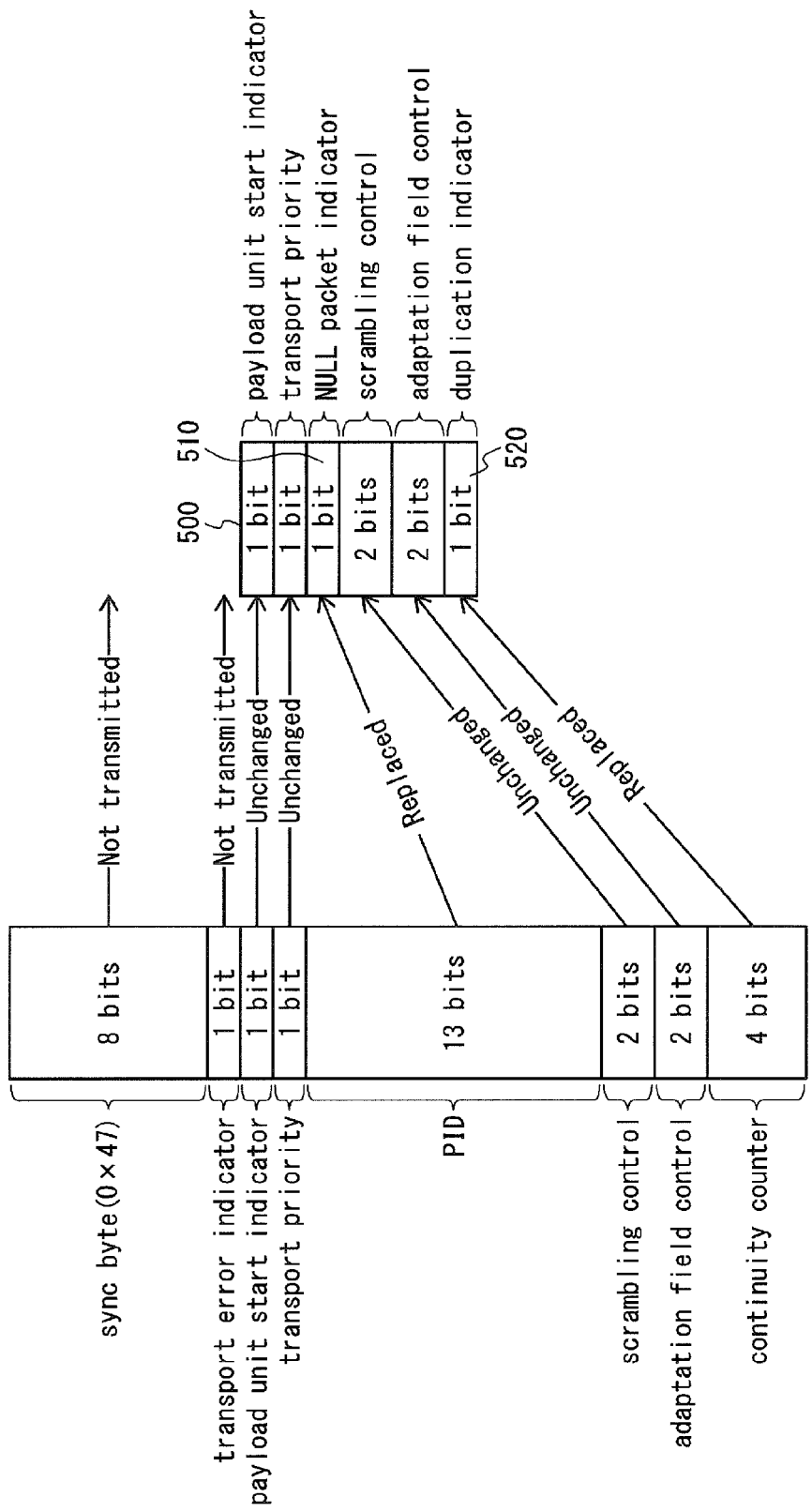
FIG. 5 is a schematic drawing illustrating an example of compression of the transport stream packet header in accordance with the present invention.

FIG. 5 illustrates an example of the present invention, in which the packet identifier 125 and the continuity counter 128 are replaced with a respective one-bit indicator 510 and 520, while the transport error indicator and the sync byte are deleted. However, the present invention is not limited to such an example. It is possible to only replace the packet identifier, and/or the continuity counter, and/or to delete the transport error indicator 122. Moreover, the packet identifier is not necessarily replaced by a one-bit NULL-packet indicator 510 as described above. It may be replaced by a short PID. The size of the short PID may be determined in such a manner that the compressed header is shorter by an integer number of bytes. For instance, when transmitting the duplicated packet indicator (1 bit), adaptation field control (2 bits), scrambling control (2 bits), transport priority (1 bit) and payload start indicator (1 bit), these are together 7 bits. In order to obtain an integer number of bytes, the short PID may have a length of up to 9 bits. Alternatively, if the 4-bit continuity counter is transmitted apart of the above parameters, 10 bits are necessary. Thus, the short PID may have a length of up to 6 bits. It should be noted that these are only examples and that other combinations are possible, such as transmitting the transport error indicator in addition or alternatively to the continuity counter. The length of the short PID is advantageously chosen so that for its signaling and for signaling the remaining parameters an integer number of bytes is necessary.

As shown in FIG. 5, if only transport stream packets from a single service component are sent in a physical layer pipe, the transport stream packet 110 PID field 125, which uniquely identifies a service component, carries redundant information and thus does not need to be transmitted. However, a one-bit indicator 510 is still needed in order to distinguish between data-carrying packets and NULL packets. The receiver knows what PID 125 is sent in a given physical layer pipe, for instance, based on a static PID-to-PLP mapping table, and can thus recover the original PID value from the compressed header 500. The recovery is needed if the packets from different physical layer pipes are re-multiplexed in order to ensure a syntactically correct transport stream at the output of the demodulator.

FIG. 5 further illustrates reducing the size of the transport stream packet header 120 by not transmitting the 4-bit continuity counter 128. However, at least one bit 520 is still needed in order to signal the packet repetition. In order to ensure a syntactically correct transport stream at the output of the demodulator, the compressed header 500 has to be decompressed and thus also the continuity counter 128 needs to be re-generated. Usually, the value of the counter at the receiver does not need to be the same as that at the transmitter, so the counter in the receiver can be initialized with an arbitrary value. The duplicated packet indicator enables the continuity counter at the receiver to increment synchronously with the continuity counter at the transmitter. If the exact value of the counter is needed, the continuity counter value may be signaled periodically so that the receiver counter may be initialized to the exact original value in the transmitter. The continuity counter may be, for instance, signaled in each baseband frame. Alternatively, it may be signaled only in the first baseband frame of a transmission frame. In this case, it is only necessary to transmit a continuity counter of the first transport stream packet included in the first baseband frame.

Moreover, FIG. 5 shows also deleting the one-bit transport error indicator field 122 from the transport stream packet header 120. If a baseband frame cannot be corrected, all transport stream packets carried in that frame are to be marked as uncorrected by setting their transport error indicator bit at the receiver. Alternatively, if a CRC checksum is used for each TS packet, the transport error indicator is set only for the corrupt packets.

Figure 6A:
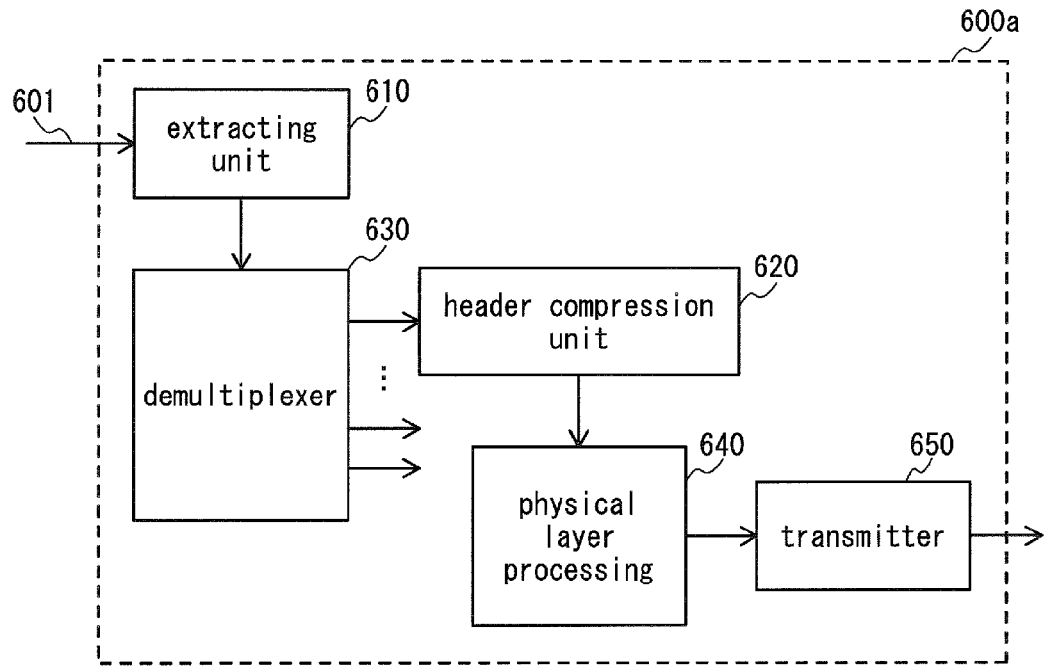
FIG. 6A is a block diagram illustrating an example digital broadcast transmitter in accordance with the present invention.
Figure 6B:
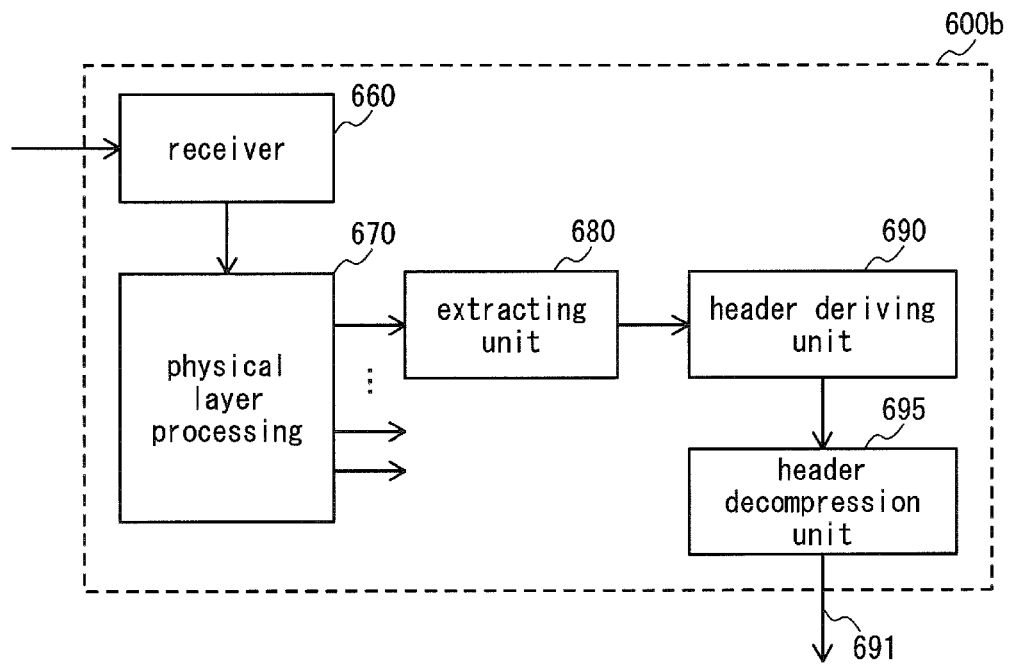
FIG. 6B is a block diagram illustrating an example digital broadcast receiver in accordance with the present invention.

FIG. 6A and FIG. 6B illustrate example transmitter 600a and receiver 600b in accordance with the present invention, respectively. A stream of transport stream packets 601 including a transport stream packet 110 is input to the extracting unit 610, in which the header 120 of the transport stream packet is extracted and according to the packet identifier 125 in the header 120, the demultiplexer 630 maps the transport stream packet 110 to a selected physical layer pipe 220. Specifically, only transport stream packets with the same PID value are mapped to one PLP. The physical layer pipe is selected based on a fixed mapping between the PID and the PLP, which is signaled to the receiver. The header of the transport stream packet is then compressed by the header compression unit 620. The header compression is performed as described above by replacing the PID field in the header 120 of the transport stream packet 110 with a NULL-packet indicator 510. Furthermore, the header compression unit 620 may compress the header by replacing the continuity counter 128 by the duplicated packet indicator 520. In addition or alternatively thereto, the header compression unit 620 may compress the header 120 by not transmitting the transport error indicator 122 and/or by not transmitting the synchronization byte 121. The transport stream packet with a compressed header 500 is then further processed in the physical layer processing unit 640. The physical layer processing 640 may include forward error correction encoding, modulation, interleaving, etc. The broadcast signal obtained by the physical layer processing 640 is then transmitted by a transmitting unit 650.

Correspondingly, the example receiver 600b has a receiving unit 660 for receiving of the broadcast signal transmitted by a transmitting apparatus as described above. The received broadcast signal is processed in a physical layer processing unit 670, which may include demapping of the digital signal from the physical resources and/or parallel processing in a plurality of physical layer pipes including deinterleaving, de-modulation, forward error correction decoding, etc. The received transport stream packet from a particular physical layer pipe passes to an extracting unit 680 where its compressed header 500 is extracted. A header parameter deriving unit 690 derives the header fields that have not been transmitted. For instance, the header parameter deriving unit 690 derives the original PID based on the signaled mapping between the PID and the physical layer pipe in which the transport stream packet is carried. According to the received NULL-packet indicator 510, the PID may be derived correctly by possibly recovering its value reserved for indicating a NULL packet and recovering the PID value indicating the data packet. The parameter deriving unit 690 may further derive the continuity counter value for the transport stream packet as described above. For instance, the continuity counter value may be transmitted once per baseband frame or once per transmitting frame and the continuity counter values of the particular transport stream packets may be derived accordingly by incrementing the signaled continuity value upon processing/reception of each transport stream packet while considering the duplicated packet indicator 128. For instance, if the duplicated packet indicator is set, the continuity counter value for the packet does not increase. The parameter deriving unit 690 may further generate the transport error indicator 122 based on the result of the forward error correction processing or of a checksum check. A header decompression unit 695 then replaces the received compressed header 500 with the decompressed header by replacing the NULL-packet indicator 510 with the derived PID 128. It may further replace the duplicated packet indicator 520 with the derived continuity counter 128 and/or insert the generated transport error indicator 122. The transport stream packet 691 with the recovered (decompressed) header is then output for further processing to the higher layers.

Figure 7:
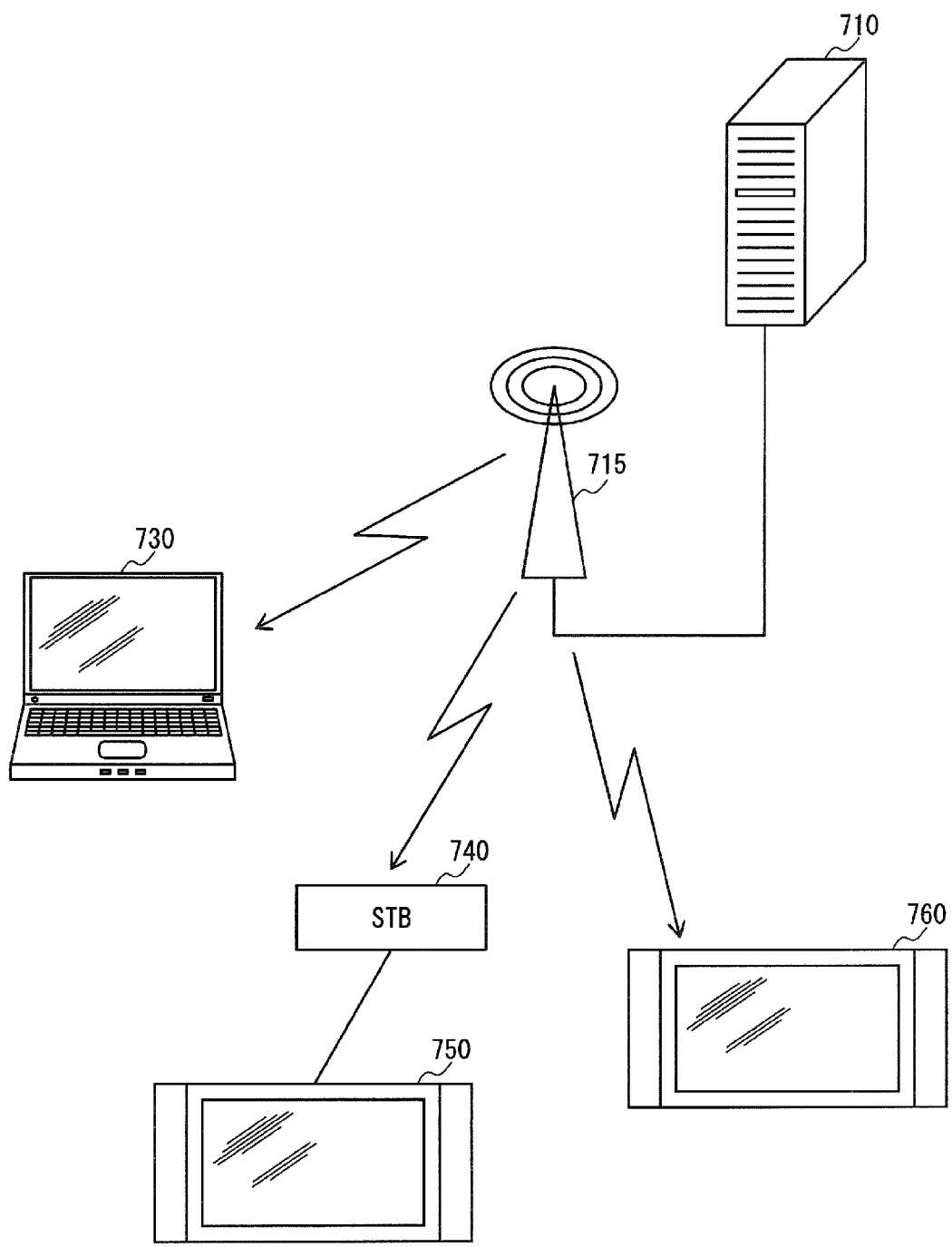
FIG. 7 is a schematic drawing illustrating an example of a digital broadcast system for applying the present invention.

FIG. 7 shows an example of a digital broadcast system in which the present invention may be applied. A transmitter 710 may implement the transport stream packet header compression of the present invention as described above, for instance, with reference to FIG. 6A. The transmitter 710 may be a single device or a plurality of interconnected devices. The transmitting station 715 transmits the broadcast signal formed by the transmitter 710. In this example, terrestrial digital broadcast system is illustrated. However, the present invention is not limited thereto and may also be applied to a satellite or a cable transmission, or to a digital broadcast transmission over any other media. The apparatuses each including a receiver illustrated in FIG. 7 are a computer such as a portable or a personal computer 730. It may, however, be also a handheld device or a mobile telephone capable of receiving the digital broadcast. Another example apparatuses are a set top box 740 connected to a digital or analog TV 750 or a digital TV 760 with integrated broadcast receiver. These example receivers and other receivers capable of receiving digital broadcast may implement the header decompression according to the present invention as described above, for instance, with reference to FIG. 6B.

It may be beneficial to support simultaneously the transmission of transport stream packets with compressed and uncompressed header within the same system or even transport stream. In order to facilitate this, according to still another embodiment of the present invention, the presence and/or type of the header compression are signaled. Preferably, the presence and/or type of the header compression is signaled within the PLP loop that describes the properties of the physical layer pipes.

Since physical layer pipes carrying transport stream packets compressed in accordance with the present invention can be mixed with physical layer pipe carrying un-compressed transport stream packets, at least a signaling bit is required for each physical layer pipe in order to signal whether compressed transport stream packets are transported in that physical layer pipe. However, the present invention is not limited to signaling a single bit as a header compression indicator. A single bit header compression indicator is beneficial in view of the transmission efficiency. Alternatively the header compression indicator may be signaled having more than one bit for indicating also the type of the header compression. The type may be, for instance, related to the number and identity of the header fields that are compressed such as compressing only the PID, compressing only the sync byte, compressing PID and continuity counter and transport error indicator and synchronization byte, etc.

The header compression indicator may be signaled, for instance, in the baseband packet headers 320. Preferably, the header compression indicator is signaled in the PLP loop of L1 signalling. An example of a possible extension of a header compression indicator of the DVB-T2 PLP loop of L1 signalling is shown below:

```
[Math.1]
for i = 0         NUM_PLP-1
{
    PLP_ID              // 8 bit: PLP ID
    PLP_PAYLOAD_TYPE    // 5 bit: TS, IP, etc.
    ...
    if PLP_PAYLOAD_TYPE == 'TS' {
    ...
    TS_COMPRESSION
    if (TS_COMPRESSION == '2 byte') {
    PID   // 13 bits
    }
    else if (TS_COMPRESSION == '1 byte') {
    PID_loop {
    PID
    short_PID
    }
    }
    ...
    }
    ...
    PLP_COD   //Coding
    PLP_MOD   //Modulation
}
```

In this example, the header compression indicator is signaled as a field TS_COMPRESSION, which is only present if the PLP_PAYLOAD_TYPE field indicates that transport stream (TS) payload data is carried in the corresponding physical layer pipe. If the maximum 2-byte header compression is selected for that physical layer pipe, the PID of the data packets carried in the physical layer pipe may be signaled within the PLP loop of L1 signalling. If the 1-byte header compression is selected, the mapping between original PID and short PID may be signaled within the PLP loop of L1 signalling.

The above example is not intended to limit the present invention to the illustrated way of signaling. For instance, the PID to PLP mapping may also be signaled in a way that does not require the PID value to be present in the above syntax. The PID may be determined from a separate PID-to-PLP mapping table.

Another embodiment of the invention relates to the implementation of the above described various embodiments using hardware and software. It is recognized that the various embodiments of the invention may be implemented or performed using computing devices (processors). A computing device or processor may for example be general-purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the examples have been outlined in relation to a DVB-T based digital broadcasting system, and the terminology mainly relates to the DVB terminology. However, this terminology and the description of the various embodiments with respect to DVB-T based broadcasting is not intended to limit the principles and ideas of the invention to such systems. Also the detailed explanations of the encoding and decoding in compliance with the DVB-T2 standard are intended to better understand the exemplary embodiments described herein and should not be understood as limiting the invention to the described specific implementations of processes and functions in the digital broadcasting. Nevertheless, the improvements proposed herein may be readily applied in the broadcasting systems described. Furthermore the concept of the invention may be also readily used in the enhancements of DVB-T2 coding currently discussed in standardization.

Figure 8:
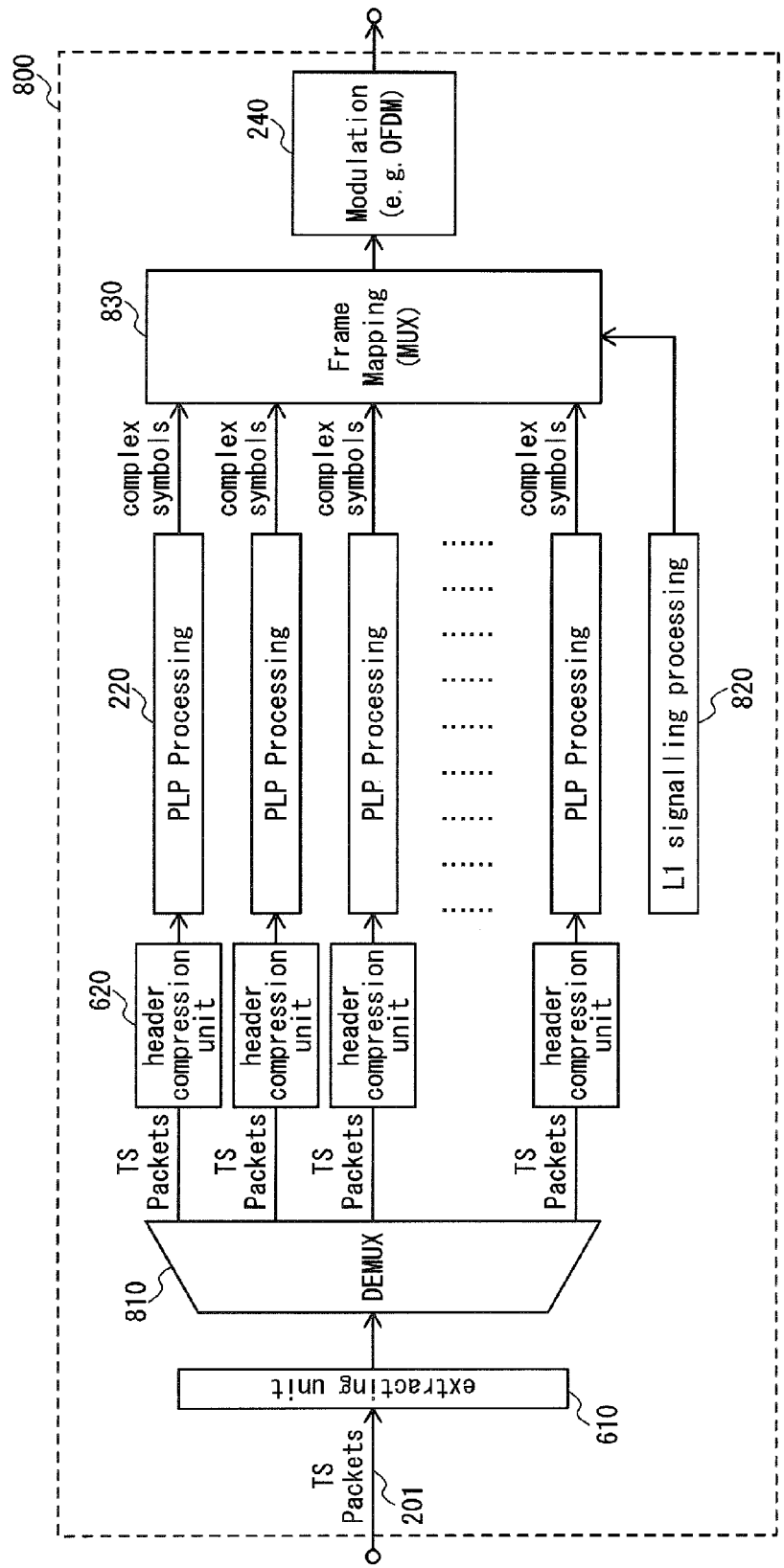
FIG. 8 illustrates the structure of a transmitter 800.

The following describes an embodiment in which the above embodiments are applied to the DVB-T2 transmission system shown in FIG. 2. FIG. 8 is a block diagram illustrating the structure of the transmitter 800. Note that the compositional elements of the transmitter 800 that are the same as those of the transmitter shown in FIG. 2 have the same reference numerals, and descriptions thereof are omitted. Only the differences are described below. As shown in FIG. 8, the transmitter 800 includes an extracting unit 610, a demultiplexer 810, a header compression unit 620, a PLP processing 220, an L1 (Layer-1) signaling processing 820, a frame mapping 830, and a modulation 240.

The extracting unit 610 specifies the header 120 of the transport stream packet 201, and extracts the specified header 120. The demultiplexer 810 maps the transport stream packet 201 to a PLP according to the packet identifier 125 of the header 120 extracted by the extracting unit 610. Specifically, the demultiplexer 630 replaces a transport stream packet which is to be mapped to a PLP other than the PLP indicated by a predefined mapping table (PID-to-PLP mapping) with a NULL packet, and as a result only transport stream packets with the same identifier value are mapped to one PLP.

The header compression unit 620 compresses the header 120 of the transport stream packet mapped by the demultiplexer 810. Here, the header compression is performed as described above by replacing the packet identifier of the header 120 with a one-bit NULL-packet indicator 510. For example. the one-bit NULL-packet indicator having a value "1" indicates that the transport stream packet is a NULL packet, and the one-bit NULL-packet indicator having a value "0" indicates that the transport stream packet is a data packet. Furthermore, the header compression unit 620 may replace the continuity counter 128 with a one-bit duplicated packet indicator 520. For example, the one-bit duplicated packet indicator having a value "1" indicates the transport stream packet is a duplicated packet, and the one-bit duplicated packet indicator having a value "0" indicates the transport stream packet is not a duplicated packet. Furthermore, in addition to or as a replacement for the above header compression, the header compression unit 620 may perform header compression by not transmitting the transport error indicator 122 and/or the sync byte 121.

The PLP processing 220, for example, performs forward error correction on the transport stream packet on which header compression has been performed, as described with reference to FIG. 2.

The L1 signaling processing 820 generates L1 (Layer-1) signaling information for each PLP including the modulation method and so on, performs forward error correction on the L1 signaling information, and outputs the L1 signaling information. As described above, the L1 signaling processing 820 preferably generates a header compression indicator as the L1 signaling information. Furthermore, the L1 signaling processing 820 preferably generates, as the L1 signaling information, information (PID-to-PLP mapping table) on a packet identifier of a transport stream packet to be mapped to each PLP.

The frame mapping 830 maps the processing result output by the PLP processing 220 and the L1 signaling information output by the L1 signaling processing 820 to the physical layer frame.

OFDM modulation is performed on the physical layer frame by the modulation 240, for example, as described with reference to FIG. 2. The physical layer frame is transmitted via the digital broadcast network. This enables transmission of the header compression indicator and the PID-to-PLP mapping table as the L1 signaling information to the receiver.

Figure 9:
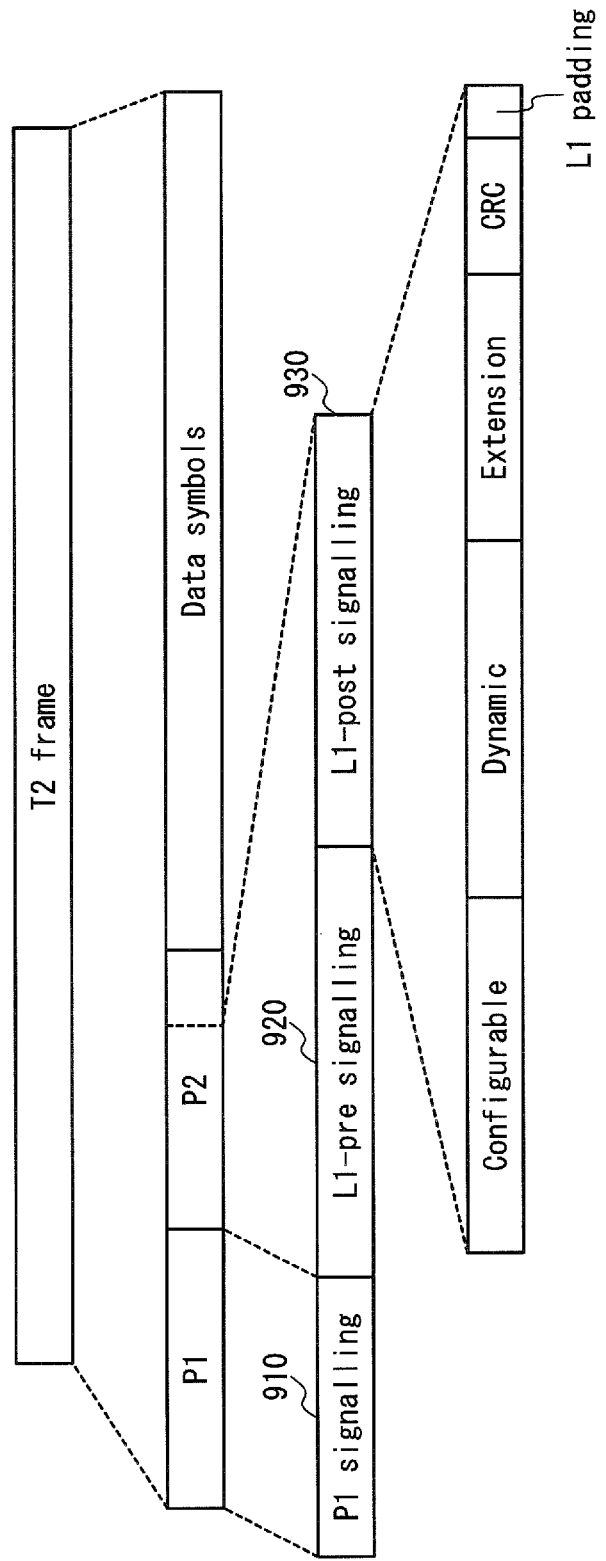
FIG. 9 illustrates the structure of the physical layer frame.

FIG. 9 illustrates the structure of the physical layer frame output by the frame mapping 830. The L1 signaling in the T2 frame is, as shown in FIG. 9, composed of three elements including P1 signaling 910, L1 pre-signaling 920, and L1 post-signaling 930 (including a configurable unit and a dynamic unit).

The parameter and the frame structure in the physical layer are described in detail in the section 7 of the Non Patent Literature 1 (ETSI standard EN 302 755), and this literature is referred to in the present specification. Also, each PLP including a transport stream packet on which header compression has been performed is multiplexed into a Data symbols region and a P2 symbol region (if available) shown in FIG. 9.

Figure 10:
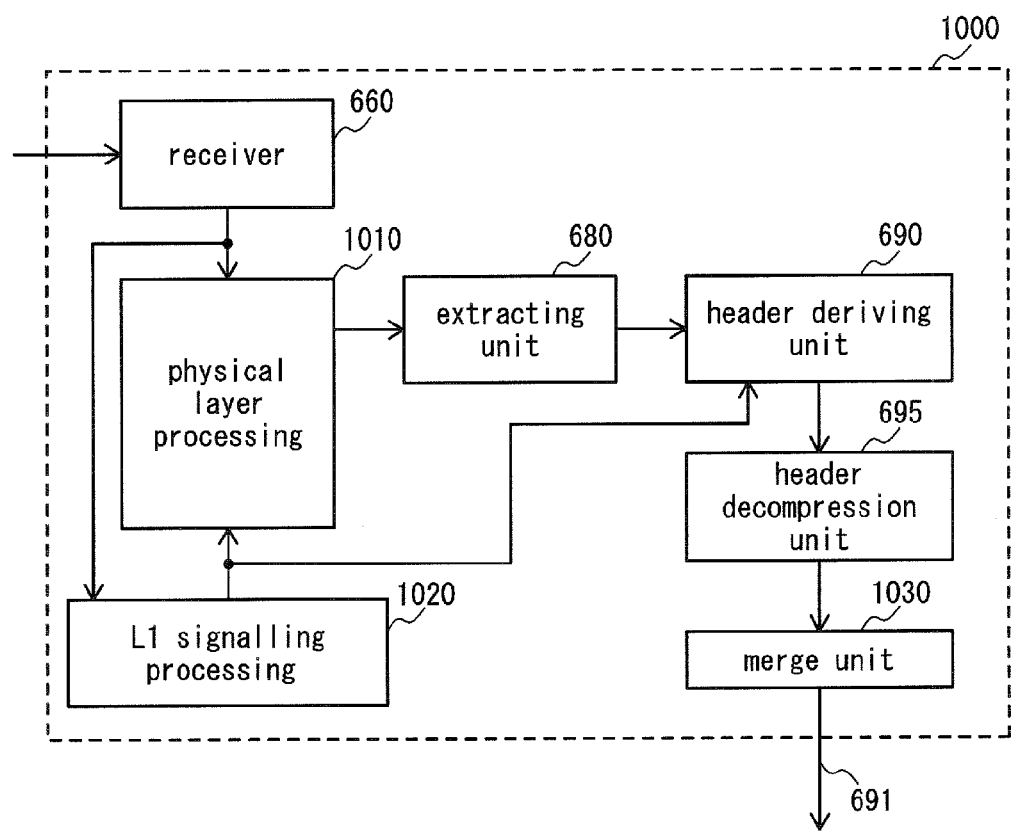
FIG. 10 illustrates the structure of a receiver 1000.

FIG. 10 is a block diagram illustrating the structure of the receiver 1000 that receives signals transmitted from the transmitter 800. Note that the compositional elements of the receiver 1000 that are the same as those of the receiver 600*b* shown in FIG. 6B have the same reference numerals, and descriptions thereof are omitted. Only the differences are described below. The receiver 1000 includes a receiving unit 660, a physical layer processing unit 1010, an L1 signaling processing 1020, an extracting unit 680, a header deriving unit 690, a header decompression unit 695, and a merge unit 1030.

The L1 signaling processing 1020 decodes L1 signaling information based on the broadcast signal output by the receiving unit 660.

The physical layer processing unit 1010 performs processing based on the L1 signaling information decoded by the L1 signaling processing 1020. This physical layer processing unit 1010 may include error correction, demodulation, interleaving, etc. As shown in FIG. 9, packets each having a different packet identifier that belong to the same transport stream are each transmitted in a different PLP. However, since the packets are each transmitted in a time-division method, the physical layer processing unit 1010 can perform processing on these plurality of PLPs in the time-division method.

The extracting unit 680 extracts the compressed header 500 of the transport stream packet output by the physical layer processing unit 1010.

The header deriving unit 690 derives header fields that have not been transmitted based on the decoded L1 signaling information. Here, the L1 signaling information used for deriving the header fields is, as described above, a compression indicator, a PID-to-PLP mapping table, etc. As described above, the header compression indicator indicates at least whether the header of the transport stream packet has been compressed or not. According to the decoded header compression indicator, the header deriving unit 690 can specify whether the header of the transport stream packet received has been compressed or not. Also, when the header compression indicator indicates a compression method of the header, the header deriving unit 690 can specify what kind of header compression has been executed based on the decoded header compression indicator. The header deriving unit 690 derives the header fields that have not been transmitted based on the information indicating whether the header compression has been executed or not and the information indicating the compression method. The PID-to-PLP mapping table indicates information on a packet identifier of a transport stream packet which has been mapped to each PLP. According to the decoded PID-to-PLP mapping table, the header deriving unit 690 derives the original 13-bit packet identifier based on the short packet identifier value. Also, the header deriving unit 690 may derive the value of the original 4-bit continuity counter, by incrementing the value depending on increase/repetition of each transport stream packet based on the duplicated packet indicator. Furthermore, the header deriving unit 690 may generate a transport error indicator based on a result of forward error correction processing or a result of checksum check.

The header decompression unit 695 replaces the compressed header 500 with the original header based on the header field obtained by the header deriving unit 690.

The merge unit 1030 integrates packets each having a different packet identifier belonging to the same transport stream output by the header decompression unit 695 to restore to the original transport stream, and outputs the restored original transport stream.

The following describes exemplary applications of the transmission and reception methods described in the above embodiments and an exemplary structure of a system suitable for the methods.

Figure 11:
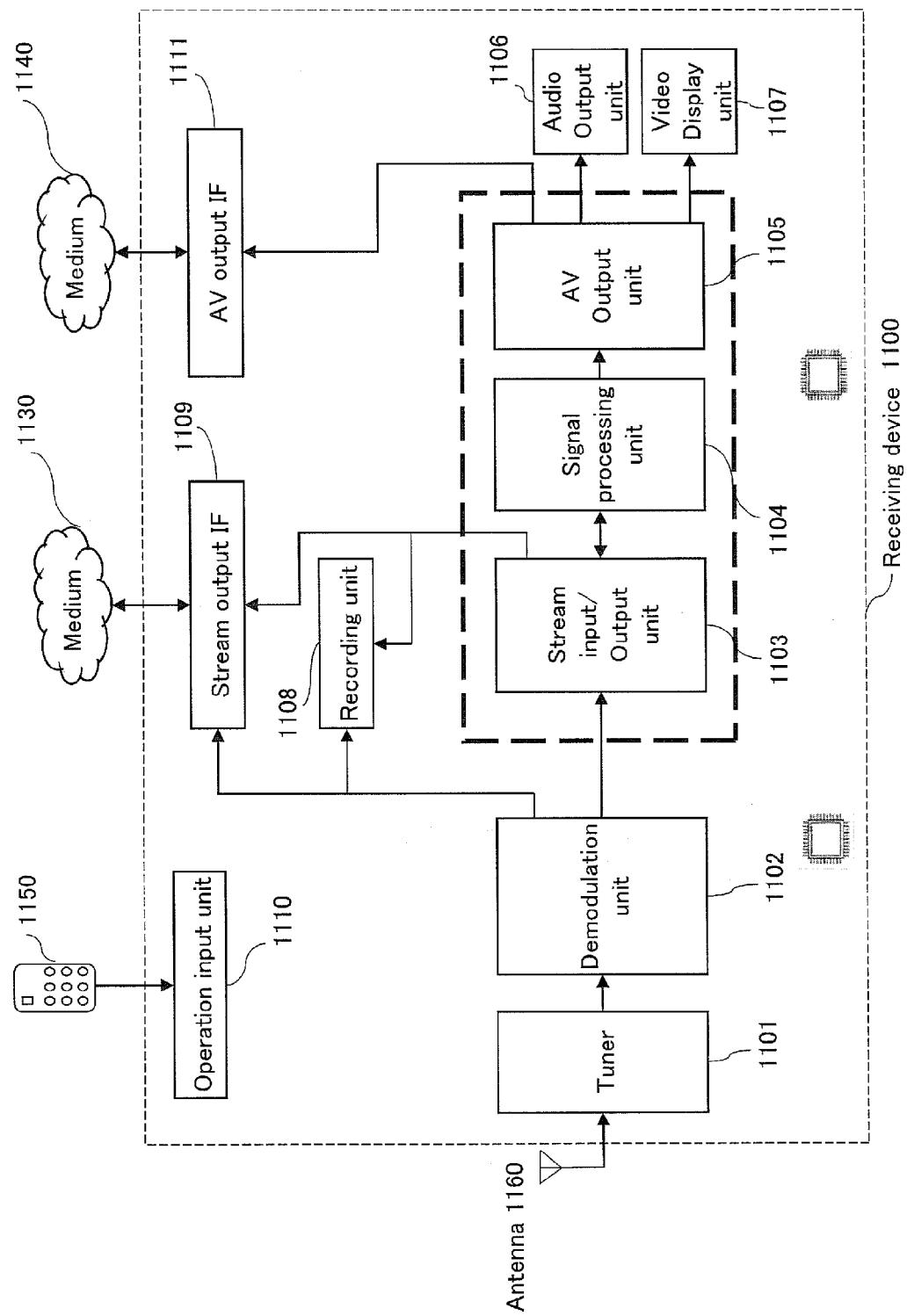
FIG. 11 is a schematic drawing illustrating an example of a receiving device.

FIG. 11 is a schematic view illustrating an exemplary structure of a receiving device 1100 for carrying out the reception methods described in the above embodiments. As illustrated in FIG. 11, in one exemplary structure, the receiving device 1100 may be composed of a modem portion implemented on a single LSI (or a single chip set) and a codec portion implemented on another single LSI (or another single chip set). The receiving device 1100 illustrated in FIG. 11 is a component that is included, for example, in the TV (television receiver) 840, the STB (Set Top Box) 840, the computer, such as the personal computer, handheld device, or mobile telephone, illustrated in FIG. 8. The receiving device 1100 includes an antenna 1160 for receiving a high-frequency signal, a tuner 1101 for transforming the received signal into a baseband signal, and a demodulation unit 1102 for demodulating transport streams from the baseband signal obtained by frequency conversion. The receiver 900b described in the above embodiments corresponds to the demodulation unit 1102 and executes any of the reception methods described in the above embodiments to receive transport streams. As a consequence, the advantageous effects of the present invention described relative to the above embodiments are produced.

The following description is directed to the case where the transport streams include at least one video stream and at least one audio stream. The video stream is for transmitting data obtained by encoding, for example, a video signal with a moving picture coding method compliant with a given standard, such as MPEG2, MPEG4-Advanced Video Coding (AVC) or VC-1. The audio stream is for transmitting data obtained by encoding, for example, an audio signal with an audio coding method compliant with a given standard, such as Dolby Audio Coding (AC)-3, Dolby Digital Plus, Meridian Lossless Packing (MLP), Digital Theater Systems (DTS), DTS-HD, or Pulse Coding Modulation (PCM).

The receiving device 1100 includes a stream input/output unit 1103, a signal processing unit 1104, an audio and visual output unit (hereinafter, AV output unit) 1105, an audio output unit 1106, and a video display unit 1107. The stream input/output unit 1103 demultiplexes video and audio streams from transport streams obtained by the demodulation unit 1102. The signal processing unit 1104 decodes the demultiplexed video stream into a video signal, using an appropriate moving picture decoding method and also decodes the demultiplexed audio stream into an audio signal using an appropriate audio decoding method. The audio and visual output unit 1105 outputs a video signal and an audio signal to an audio and visual output interface (hereinafter, AV output IF) 1111. The audio output unit 1106, such as a speaker, produces audio output according to the decoded audio signal. The video display unit 1107, such as a display monitor, produces video output according to the decoded video signal. For example, the user may operate the remote control 1150 to select a channel (of a TV program or audio broadcast), so that information indicative of the selected channel is transmitted to an operation input unit 1110. In response, the receiving device 1100 demodulates, from among signals received with the antenna 1160, a signal carried on the selected channel and applies error correction, so that reception data is extracted. At the time of data reception, the receiving device 1100 receives control symbols containing information indicating a transmission method of a signal carried on the selected channel, so that the information indicative of the transmission method is obtained. With this information, the receiving device 1100 is enabled to make appropriate settings for the receiving operation, demodulation method, and error correction method to duly receive transport streams transmitted from a broadcast station (base station). Here, for example, symbols carried by P1-signaling, L1-pre signaling, and L1-post signaling described in the above embodiments correspond to the control symbols. Similarly, the FEC coding rate per PLP, the modulation constellation and related parameters contained in P1-signaling, L1-pre signaling, and L1-post signaling correspond to the information about the transmission method. Although the above description is directed to an example in which the user selects a channel using the remote control 1150, the same description applies to an example in which the user selects a channel using a selection key provided on the receiving device 1100.

With the above structure, the user can view a broadcast program that the receiving device 1100 receives by the reception methods described in the above embodiments.

The receiving device 1100 according to this embodiment may additionally include a recording unit (drive) 1108 for recording various data onto a recording medium, such as a magnetic disk, optical disc, or a non-volatile semiconductor memory. Examples of data to be recorded by the recording unit 1108 include data contained in transport streams that are obtained as a result of demodulation and error correction by the demodulation unit 1102, data equivalent to such data (for example, data obtained by compressing the data), and data obtained by processing the moving pictures and/or audio. (Note here that there may be a case where no error correction is performed by the demodulation unit 1102 and where the receiving device 1100 conducts another signal processing after error correction. The same holds in the following description where similar wording appears). Note that the term "optical disc" used herein refers to a recording medium, such as Digital Versatile Disc (DVD) or BD (Blu-ray Disc), that is readable and writable with the use of a laser beam. Further, the term "magnetic disk" used herein refers to a recording medium, such as an floppy disk (FD, registered trademark) or hard disk, that is writable by magnetizing a magnetic substance with magnetic flux. Still further, the term "non-volatile semiconductor memory" refers to a recording medium, such as flash memory or ferroelectric random access memory, composed of semiconductor element(s). Specific examples of non-volatile semi-conductor memory include an SD card using flash memory and a flash solid state drive (SSD). It should be naturally appreciated that the specific types of recording mediums mentioned herein are merely examples and any other types of recording mediums may be usable.

With the above structure, the user can record a broadcast program that the receiving device 1100 receives with any of the reception methods described in the above embodiments, and time-shift viewing of the recorded broadcast program is possibly anytime after the broadcast.

In the above description of the receiving device 1100, the recording unit 1108 records transport streams obtained by the demodulation unit 1102. However, the recording unit 1108 may record part of data extracted from the data contained in the transport streams. For example, the transport streams demodulated by the demodulation unit 1102 may contain contents of data broadcast service, in addition to the video and audio streams. In this case, new transport streams may be generated by multiplexing the video and audio streams, without the contents of broadcast service, extracted from the transport streams demodulated by the demodulation unit 1102, and the recording unit 1108 may record the newly generated transport streams. In another example, new transport streams may be generated by multiplexing either of the video stream and audio stream contained in the transport streams obtained as a result of demodulation and error correction by the demodulation unit 1102, and the recording unit 1108 may record the newly generated transport streams. In yet another example, the recording unit 1108 may record the contents of data broadcast service included, as described above, in the transport streams.

As described above, the receiving device 1100 described in this embodiment may be included in a TV, a recorder (such as DVD recorder, Blu-ray recorder, HDD recorder, or SD card recorder), or a mobile telephone. In such a case, the transport streams obtained as a result of demodulation and error correction by the demodulation unit 1102 may contain data for correcting errors (bugs) in software used to operate the TV or recorder or in software used to protect personal or confidential information. If such data is contained, the data is installed to the TV or recorder to correct the errors. Further, if data for correcting errors (bugs) in software installed in the receiving device 1100 is contained, such data is used to correct errors that the receiving device 1100 may have. This arrangement ensures more stable operation of the TV, recorder, or mobile phone in which the receiving device 1100 is implemented.

Note that it may be the stream input/output unit 1103 that handles extraction of data from the whole data contained in transport streams obtained as a result of demodulation and error correction by the demodulation unit 1102 and multiplexing of the extracted data. More specifically, under instructions given from a control unit, such as CPU, not illustrated in the figures, the stream input/output unit 1103 demultiplexes a video stream, an audio stream, contents of data broadcast service etc. from the transport streams demodulated by the demodulation unit 1102, and extracts specific pieces of data from the demultiplexed data, and multiplexes the extracted data pieces to generate new transport streams. The data pieces to be extracted from demultiplexed data may be determined by the user or determined in advance for the respective types of recording mediums.

With the above structure, the receiving device 1100 is enabled to extract and record only data necessary to view a recorded broadcast program, which is effective to reduce the size of data to be recorded.

In the above description, the recording unit 1108 records transport streams obtained as a result of demodulation and error correction by the demodulation unit 1102. Alternatively, however, the recording unit 1108 may record new transport streams generated by multiplexing a video stream newly generated by encoding the original video stream contained in the transport streams obtained as a result of demodulation and error correction by the demodulation unit 1102. Here, the moving picture coding method to be employed may be different from that used to encode the original video stream, such that the data size or bit rate of the new video stream is smaller than the original video stream. Here, the moving picture coding method used to generate the new video stream may be of a different standard from that used to generate the original video stream. Alternatively, the same moving picture coding method may be used but with different parameters. Similarly, the recording unit 1108 may record new transport streams generated by multiplexing an audio stream newly obtained by encoding the original audio stream contained in the transport streams obtained as a result of demodulation and error correction by the demodulation unit 1102. Here, the audio coding method to be employed may be different from that used to encode the original audio stream, such that the data size or bit rate of the new audio stream is smaller than the original audio stream.

Note that it may be the stream input/output unit 1103 and the signal processing unit 1104 that perform the process of coding the original video or audio stream contained in the transport streams obtained as a result of demodulation and error correction by the demodulation unit 1102 into the video or audio stream of different data size or bit rate. More specifically, under instructions given from the control unit such as CPU, the stream input/output unit 1103 demultiplexes a video stream, an audio stream, contents of data broadcast service etc. from the transport streams obtained as a result of demodulation and error correction by the demodulation unit 1102. Under instructions given from the control unit, the signal processing unit 1104 encodes the demultiplexed video stream and audio stream respectively using a motion picture coding method and an audio coding method each different from the coding method used to encode the video and audio streams originally contained in the transport streams. Under instructions given from the control unit, the stream input/output unit 1103 multiplexes the newly encoded video stream and audio stream to generate new transport streams. Note that the signal processing unit 1104 may conduct the conversion of either or both of the video or audio stream according to instructions given from the control unit. In addition, the sizes of video and audio streams to be obtained by encoding may be specified by a user or determined in advance for the types of recording mediums.

With the above arrangement, the receiving device 1100 is enabled to record video and audio streams after converting the streams to a size recordable on the recording medium or to a size or bit rate that matches the read or write rate of the recording unit 1108. This arrangement ensures that the recording unit duly records a broadcast program, even if the transport streams obtained as a result of demodulation and error correction by the demodulation unit 1102 are larger in size than the size recordable on the recording medium or higher in bit rate than the read or write rate of the recording unit. Consequently, time-shift viewing of the recorded broadcast program by the user is possible anytime after the broadcast.

Furthermore, the receiving device 1100 additionally includes a stream output interface (IF) 1109 for transmitting transport streams demodulated by the demodulation unit 1102 to an external device via a transport medium 1130. In one example, the stream output IF 1109 may be a radio communication device that transmits transport streams, which are obtained by demodulation, via a wireless medium (equivalent to the transport medium 1130) to an external device, using a wireless communication method compliant with a wireless communication standard, such as Wi-Fi (registered trademark, a set of standards including IEEE 802.11a, IEEE 802.11g, and IEEE 802.11n), WiGiG, Wireless HD, Bluetooth, or Zigbee. In another example, the stream output IF 1109 may be a wired communication device that transmits transport streams, which are obtained by demodulation, via a transmission line (equivalent to the transport medium 1130) physically connected to the stream output IF 1109 to an external device, using a communication method compliant with wired communication standards, such as Ethernet (registered trademark), USB (Universal Serial Bus), PLC (Power Line Communication), or HDMI (High-Definition Multimedia Interface).

With the above structure, the user can use, on an external device, transport streams received by the receiving device 1100 using the reception method described according to the above embodiments. The usage of transport streams by a user mentioned herein include to use the transport streams for real-time viewing on an external device, to record the transport streams by a recording unit included in an external device, and to transmit the transport streams from an external device to a yet another external device.

In the above description of the receiving device 1100, the stream output IF 1109 outputs transport streams obtained as a result of demodulation and error correction by the demodulation unit 1102. However, the receiving device 1100 may output data extracted from data contained in the transport streams, rather than the whole data contained in the transport streams. For example, transport streams obtained as a result of demodulation and error correction by the demodulation unit 1102 may contain contents of data broadcast service, in addition to video and audio streams. In this case, the stream output IF 1109 may output transport streams newly generated by multiplexing video and audio streams extracted from the transport streams obtained as a result of demodulation and error correction by the demodulation unit 1102. In another example, the stream output IF 1109 may output transport streams newly generated by multiplexing either of the video stream and audio stream contained in the transport streams obtained as a result of demodulation and error correction by the demodulation unit 1102.

Note that it may be the stream input/output unit 1103 that handles extraction of data from the whole data contained in transport streams obtained as a result of demodulation and error correction by the demodulation unit 1102 and multiplexing of the extracted data. More specifically, under instructions given from a control unit, such as CPU, not illustrated in the figures, the stream input/output unit 1103 demultiplexes a video stream, an audio stream, contents of data broadcast service etc. from the transport streams demodulated by the demodulation unit 1102, and extracts specific pieces of data from the demultiplexed data, and multiplexes the extracted data pieces to generate new transport streams. The data pieces to be extracted from demultiplexed data may be determined by the user or determined in advance for the respective types of the stream output IF 1109.

With the above structure, the receiving device 1100 is enabled to extract and output only data necessary for an external device, which is effective to reduce the bandwidth used to output the transport streams.

In the above description, the stream output IF 1109 outputs transport streams obtained as a result of demodulation and error correction by the demodulation unit 1102. Alternatively, however, the stream output IF 1109 may output new transport streams generated by multiplexing a video stream newly obtained by encoding the original video stream contained in the transport streams obtained as a result of demodulation and error correction by the demodulation unit 1102. The new video stream is encoded with a moving picture coding method different from that used to encode the original video stream, such that the data size or bit rate of the new video stream is smaller than the original video stream. Here, the moving picture coding method used to generate new video stream may be of a different standard from that used to generate the original video stream. Alternatively, the same moving picture coding method may be used but with different parameters. Similarly, the stream output IF 1109 may output new transport streams generated by multiplexing an audio stream newly obtained by encoding the original audio stream contained in the transport streams obtained as a result of demodulation and error correction by the demodulation unit 1102. The new audio stream is encoded with an audio coding method different from that used to encode the original audio stream, such that the data size or bit rate of the new audio stream is smaller than the original audio stream.

The process of converting the original video or audio stream contained in the transport streams obtained as a result of demodulation and error correction by the demodulation unit 1102 into the video or audio stream of different data size of bit rate is performed, for example, by the stream input/output unit 1103 and the signal processing unit 1104. More specifically, under instructions given from the control unit, the stream input/output unit 1103 demultiplexes a video stream, an audio stream, contents of data broadcast service etc. from the transport streams obtained as a result of demodulation and error correction by the demodulation unit 1102. Under instructions given from the control unit, the signal processing unit 1104 converts the demultiplexed video stream and audio stream respectively using a motion picture coding method and an audio coding method each different from the method that was used in the conversion applied to obtain the video and audio streams. Under instructions given from the control unit, the stream input/output unit 1103 multiplexes the newly converted video stream and audio stream to generate new transport streams. Note that the signal processing unit 1104 may conduct the conversion of either or both of the video or audio stream according to instructions given from the control unit. In addition, the sizes of video and audio streams to be obtained by conversion may be specified by a user or determined in advance for the types of the stream output IF 1109.

With the above structure, the receiving device 1100 is enabled to output video and audio streams after converting the streams to a bit rate that matches the transfer rate between the receiving device 1100 and an external device. This arrangement ensures that even if transport streams obtained as a result of demodulation and error correction by the demodulation unit 1102 are higher in bit rate than the data transfer rate to an external device, the stream output IF duly outputs new transport streams at an appropriate bit rate to the external device. Consequently, the user can use the new transport streams on another communication device.

Furthermore, the receiving device 1100 also includes the AV output IF 1111 that outputs video and audio signals decoded by the signal processing unit 1104 to an external device via an external transport medium. In one example, the AV output IF 1111 may be a wireless communication device that transmits transport streams, which are obtained by demodulation, via a wireless medium to an external device, using a wireless communication method compliant with wireless communication standards, such as Wi-Fi (registered trademark), which is a set of standards including IEEE 802.11a, IEEE 802.11g, and IEEE 802.11n, WiGiG, Wireless HD, Bluetooth, or Zigbee. In another example, the stream output IF 1109 may be a wired communication device that transmits modulated video and audio signals via a transmission line physically connected to the stream output IF 1109 to an external device, using a communication method compliant with wired communication standards, such as Ethernet (registered trademark), USB, PLC, or HDMI. In yet another example, the stream output IF 1109 may be a terminal for connecting a cable to output the video and audio signals in analog form.

With the above structure, the user is allowed to use on an external device the video and audio signals decoded by the signal processing unit 1104.

Furthermore, the receiving device 1100 additionally includes an operation input unit 1110 for receiving a user operation. According to control signals indicative of user operations input to the operation input unit 1110, the receiving device 1100 performs various operations, such as switching the power ON or OFF, switching the currently selected receive channel to another channel, switching the display of subtitle text ON or OFF, switching the display of subtitle text to another language, changing the volume of audio output of the audio output unit 1106, and changing the settings of channels that can be received.

Additionally, the receiving device 1100 may have a function of displaying the antenna level indicating the quality of the signal being received by the receiving device 1100. Note that the antenna level is an indicator of the reception quality calculated based on, for example, the Received Signal Strength Indication, Received Signal Strength Indicator (RSSI), received field strength, Carrier-to-noise power ratio (C/N), Bit Error Rate (BER), packet error rate, frame error rate, and channel state information of the signal received on the receiving device 1100. In other words, the antenna level is a signal indicating the level and quality of the received signal. In this case, the demodulation unit 1102 also serves the function of a reception quality measuring unit for measuring the received signal characteristics, such as RSSI, the received field strength, C/N, BER, packet error rate, frame error rate, and channel state information. In response to a user operation, the receiving device 1100 displays the antenna level (i.e., signal indicating the level and quality of the received signal) on the video display unit 1107 in a manner identifiable by the user. The antenna level (i.e., signal indicating the level and quality of the received signal) may be numerically displayed using a number that represents the RSSI, received field strength, C/N, BER, packet error rate, frame error rate, channel state information or the like. Alternatively, the antenna level may be displayed using an image representing the RSSI, received field strength, C/N, BER, packet error rate, frame error rate, channel state information or the like.

Let us assume the following case: when the broadcast station (base station) 715 transmits a plurality of elementary streams constituting a program (e.g., one or more video streams, one or more audio streams, and one or more metadata streams), a hierarchical transmission method is achieved by (i) setting the forward error correction coding rate, constellation size based on a modulation method, interleaving length and other physical layer parameters separately for each individual physical layer pipe, and (ii) specifying a robustness level separately for each individual physical layer pipe. In this case, the receiving device 1100 may be configured in the following manners. The receiving device 1100 may have the functions of, for example, (i) calculating indices that respectively indicate a plurality of reception qualities for a plurality of hierarchies, and (ii) displaying the calculated indices as a plurality of antenna levels (signals that indicate levels and superior/inferior qualities of received signals, respectively), either all at once or by switching from display of one index to display of another index. Alternatively, the receiving device 1100 may have the functions of (i) calculating an index indicating a reception quality for all or some of the hierarchies, and (ii) displaying the calculated index as an antenna level (a signal indicating a level and a superior/inferior quality of the received signals).

In a case where the signals are received by using any of the reception methods described in the above embodiments, the above structure enables the user to numerically or visually grasp an antenna level (a signal indicating a level and a superior/inferior quality of the received signals) either for each hierarchy or for each hierarchy group made up of two or more hierarchies.

Also, the receiving device 1100 may have the function of switching between elementary streams to be played back (decoded) according to a reception condition of each elementary stream constituting the program being viewed, or the function of displaying the reception condition of each elementary stream constituting such a program. In a case where the broadcast station (base station) 715 achieves a hierarchical transmission method by (i) setting the forward error correction coding rate, constellation size based on a modulation method, interleaving length and other physical layer parameters separately for each individual physical layer pipe and (ii) specifying a robustness level separately for each individual physical layer pipe, there is a possibility that a reception condition may differ for each PLP in the receiving device 1100. For example, assume a case where a plurality of elementary streams constituting a program are transmitted over a first physical layer pipe and a second physical layer pipe that has a lower robustness level than the first physical layer pipe. In this case, depending on the receiving environment, there is a possibility that an elementary stream(s) transmitted over the first physical layer pipe is received/obtained in a good reception condition, whereas an elementary stream(s) transmitted over the second physical layer pipe is received/obtained in a poor reception condition. At this time, the receiving device 1100 judges whether the reception condition is good or poor based on, for example, (i) pieces of information such as the RSSI, field strength, C/N, BER, packet error rate, and frame error rate of the received signals, and channel state information of the received signals, and (ii) pieces of robustness level information set in the physical layer pipes over which the elementary streams are transmitted. Alternatively, the receiving device 1100 may perform the above judgment as to whether the reception condition is good or poor based on the following criterion: whether the error rate of a baseband frame of each elementary stream or the error rate of a TS packet of each elementary stream per unit of time, is (i) larger than or equal to a predetermined threshold value, or (ii) smaller than the predetermined threshold value. For each of the plurality of elementary streams constituting the program, the demodulation unit 1102 of the receiving device 1100 judges whether the reception condition of the elementary stream is good or poor and outputs a signal indicating the judged reception condition. Based on the signals indicating the reception conditions of the elementary streams, the receiving device 1100 performs control of switching between elementary streams to be decoded by the signal processing unit 1104, control of displaying information indicating a reception condition of the program on the video display unit 1107, etc.

The following explains one example of operations performed by the receiving device 1100 when the plurality of elementary streams constituting the program include a plurality of video streams. It is assumed here that the plurality of elementary streams constituting the program include a first video stream obtained by encoding low-definition video and a second video stream contained by encoding high-definition video (differential data used to play back the high-definition video in succession to the low-definition video). It is also assumed here that a physical layer pipe over which the first video stream is transmitted has a higher robustness level than a physical layer pipe over which the second video stream is transmitted, and that the reception condition of the first video stream is always better than or equal to the reception condition of the second video stream. When the reception condition of the second video stream is good, the signal processing unit 1104 of the receiving device 1100 performs decoding by using both of the first and second video streams, and the receiving device 1100 displays a high-definition video signal obtained through the decoding on the video display unit 1107. On the other hand, when the reception condition of the second video stream is poor, the signal processing unit 1104 of the receiving device 1100 performs decoding by using the first video stream only, and the receiving device 1100 displays a low-definition video signal obtained through the decoding on the video display unit 1107.

When the reception condition of the second video stream is poor, the above structure allows stably displaying low-definition video to the user instead of rough high-definition video.

It should be noted that according to the above structure, the receiving device 1100 does not judge whether the reception condition of the first video stream is good or poor. This is because, even if the reception condition of the first video stream is poor, displaying the low-definition video obtained by decoding the first video stream is thought to be more preferable than not displaying the video of the first video stream by stopping the decoding of the first video stream, even with presence of roughness or interruption in the video of the first video stream. However, it goes without saying that the receiving device 1100 may judge whether the reception condition is good or poor for both of the first and second video streams and switch between elementary streams to be decoded by the signal processing unit 1104 based on a result of the judgment. In this case, when the reception conditions of the first and second video streams are both good, the signal processing unit 1104 of the receiving device 1100 performs decoding by using both of the first and second video streams, and the receiving device 1100 displays a high-definition video signal obtained through the decoding on the video display unit 1107. On the other hand, when the reception condition of the second video stream is poor but the reception condition of the first video stream is good, the signal processing unit 1104 of the receiving device 1100 performs decoding by using the first video stream, and the receiving device 1100 displays a low-definition video signal obtained through the decoding on the video display unit 1107. On the other hand, when the reception conditions of the first and second video streams are both poor, the receiving device 1100 stops the decoding processing, i.e., does not decode the first and second video streams. The above structure can suppress the power consumption by stopping the decoding processing when the reception conditions of the first and second video streams are both so poor that the user cannot figure out what the video is about upon display of the decoded first video stream.

With respect to the above structure, the receiving device 1100 may judge whether the reception condition of the first video stream is good or poor based on a criterion different from a criterion based on which whether the reception condition of the second video stream is good or poor.

For example, when judging whether the reception conditions of the first and second video streams are good or poor based on the error rate of a baseband frame of each video stream or the error rate of a TS packet of each video stream per unit of time, the receiving device 1100 makes a first threshold value that is used in judging whether the reception condition of the first video stream is good or poor larger than a second threshold value that is used in judging whether the reception condition of the second video stream is good or poor.

Also, the receiving device 1100 may perform the judgment as to whether the reception condition of the second video stream is good or poor based on the error rate of a baseband frame of the second video stream or the error rate of a TS packet of the second video stream per unit of time, while performing the judgment as to whether the reception condition of the first video stream is good or poor based on whether the L1-pre signalling and L1-post signalling discussed in the above embodiments have been received or not. Also, the receiving device 1100 may perform the judgment as to whether the reception condition of the second video stream is good or poor based on the error rate of a baseband frame of the second video stream or the error rate of a TS packet of the second video stream per unit of time, while performing the judgment as to whether the reception condition of the first video stream is good or poor based on pieces of information such as the RSSI, field strength, and C/N of the received signals. The above structure allows setting a criterion for stopping the decoding of the video streams for each video stream.

It has been described above that the video stream obtained by encoding low-definition video and the video stream obtained by encoding high-definition video are transmitted over different PLPs having different robustness levels. Similarly, combinations of other elementary streams may also be transmitted over different PLPs having different robustness levels. For example, in the case of a plurality of video streams that are respectively obtained by encoding a plurality of moving pictures which make up 3D video with different viewing angles, such video streams may be transmitted over different PLPs having different robustness levels. A video stream and an audio stream may be transmitted over different PLPs having different robustness levels. The receiving device 1100 can achieve the effects that are similar to the effects of the above structure by selecting, from among the received elementary streams, an elementary stream(s) that has been judged to be in a good reception condition, and playing back (decoding) the selected elementary stream(s).

In a case where the playback (decoding) is not performed with use of the elementary streams constituting the program due to poor reception conditions of part of the elementary streams, the receiving device 1100 may multiplex a text or an image indicating the part of the elementary streams with poor reception conditions or the rest of the elementary streams with good reception conditions, and then display the text or the image on the video display unit 1107. For example, in a case where a program being broadcast as high-definition video is displayed as low-definition video, the above structure enables the user to easily acknowledge that the low-definition video is displayed because of poor reception conditions.

It has been described above that the demodulation unit 1102 judges the reception condition for each of the plurality of elementary streams constituting the program. Alternatively, the signal processing unit 1104 may judge whether or not each elementary stream has been received based on a value of a transport error identifier appended to each TS packet of input video streams and audio streams.

Although the receiving device 1100 is described above as having the audio output unit 1106, video display unit 1107, recording unit 1108, stream output IF 1109, and AV output IF 1111, it is not necessary that the receiving device 1100 has all of these units. As long as the receiving device 1100 is provided with at least one of the units 1106-1111 described above, the user is enabled to use transport streams obtained as a result of demodulation and error correction by the demodulation unit 1102. It is therefore applicable that the receiving device 1100 has one or more of the above-described units in any combination depending on its application.

Transport Streams

The following is a detailed description of an exemplary structure of a transport stream.

Figure 12:
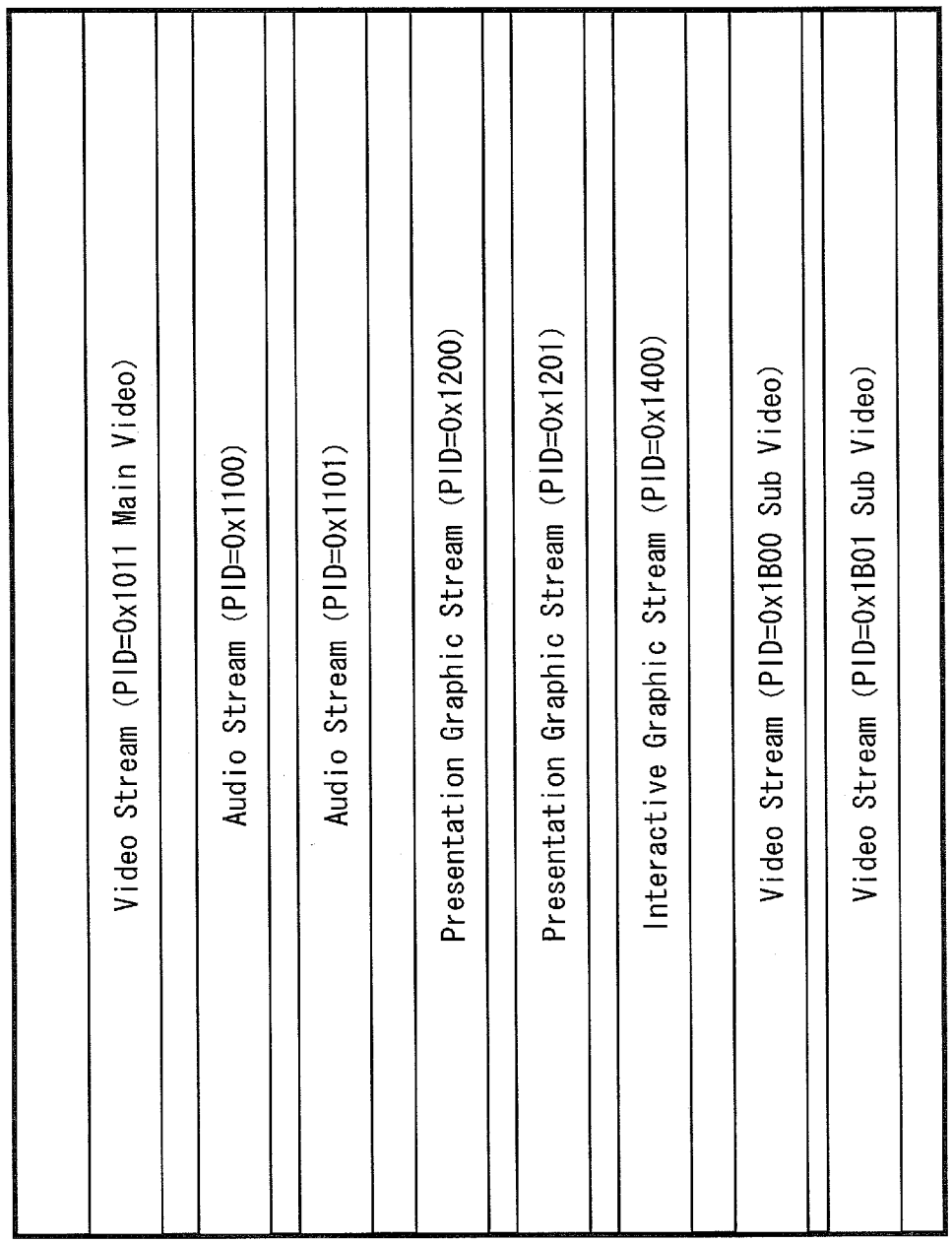
FIG. 12 is a schematic drawing illustrating the structure of multiplexed data.

FIG. 12 is a view illustrating an exemplary transport stream structure. As illustrated in FIG. 12, a transport stream is obtained by multiplexing one or more of elementary streams, which are elements constituting a broadcast program (program or an event which is part of a program) currently provided through respective services. Examples of elementary streams include a video stream, audio stream, presentation graphic (PG) stream, and interactive graphic (IG) stream. In the case where a broadcast program carried by transport stream(s) is a movie, the video streams represent main video and sub video of the movie, the audio streams represent main audio of the movie and sub audio to be mixed with the main audio, and the PG stream represents subtitles of the movie. The term "main video" used herein refers to video images normally presented on a screen, whereas "sub video" refers to video images (for example, images of text explaining the outline of the movie) to be presented in a small window inserted within the video images. The IG stream represents an interactive display constituted by presenting GUI components on a screen.

Each stream contained in a transport stream is identified by an identifier called PID uniquely assigned to the stream. For example, the video stream carrying main video images of a movie is assigned with "0x1011", each audio stream is assigned with a different one of "0x1100" to "0x111F", each PG stream is assigned with a different one of "0x1200" to "0x121F", each IG stream is assigned with a different one of "0x1400" to "0x141F", each video stream carrying sub video images of the movie is assigned with a different one of "0x1B00" to "0x1B1F", each audio stream of sub-audio to be mixed with the main audio is assigned with a different one of "0x1A00" to "0x1A1F".

Figure 13:
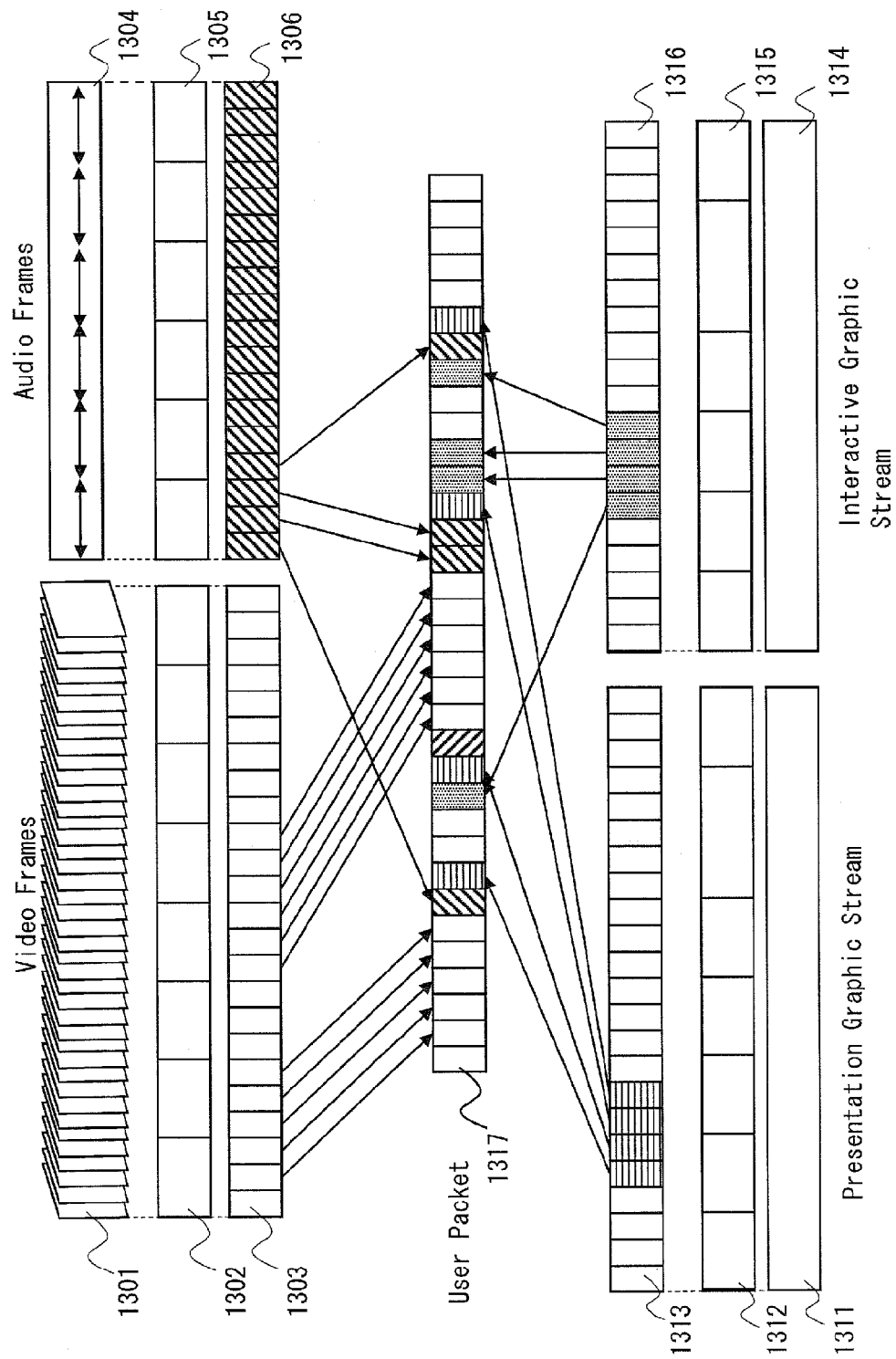
FIG. 13 is a schematic drawing illustrating how each stream is multiplexed.

FIG. 13 is a schematic view illustrating an example of how a transport stream is multiplexed. First, a video stream 1301 composed of a plurality of video frames is converted into a PES packet sequence 1302 and then into a TS packet sequence 1303, whereas an audio stream 1304 composed of a plurality of audio frames is converted into a PES packet sequence 1305 and then into a TS packet sequence 1306. Similarly, the PG stream 1311 is first converted into a PES packet sequence 1312 and then into a TS packet sequence 1313, whereas the IG stream 1314 is converted into a PES packet sequence 1315 and then into a TS packet sequence 1316. The transport stream 1317 is obtained by multiplexing the TS packet sequences (1303, 1306, 1313 and 1316) into one stream.

Figure 14:
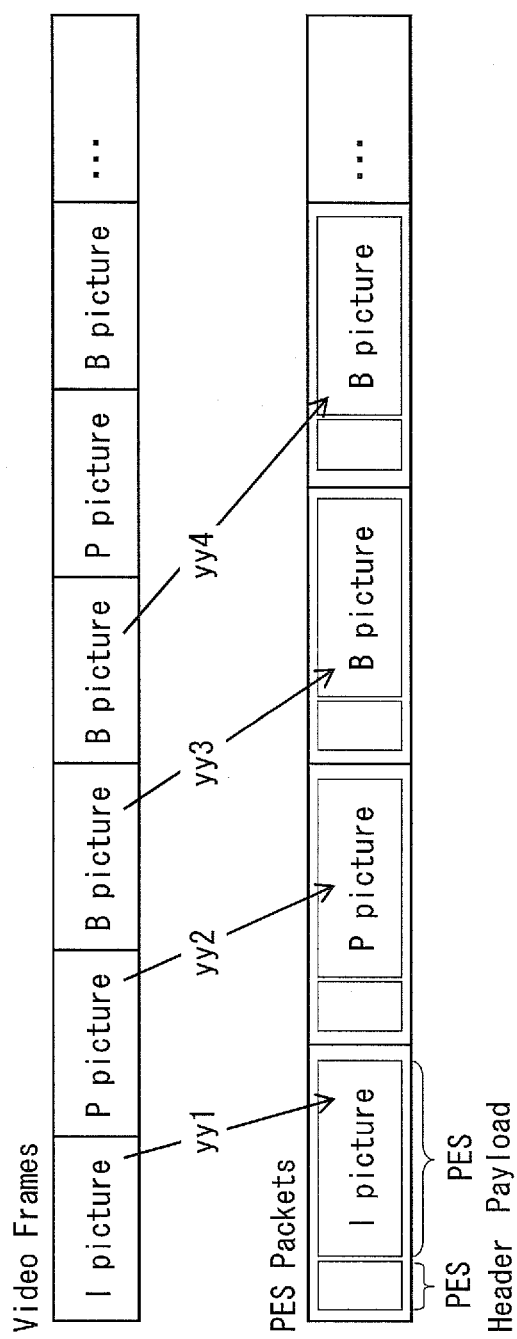
FIG. 14 is a schematic drawing illustrating in detail how a video stream is stored in a sequence of PES packets.

FIG. 14 illustrates the details of how a video stream is divided into a sequence of PES packets. In FIG. 14, the first tier shows a sequence of video frames included in a video stream. The second tier shows a sequence of PES packets. As indicated by arrows yy1, yy2, yy3, and yy4 shown in FIG. 14, a plurality of video presentation units, namely I pictures, B pictures, and P pictures, of a video stream are separately stored into the payloads of PES packets on a picture-by-picture basis. Each PES packet has a PES header and the PES header stores a Presentation Time-Stamp (PTS) and Decoding Time-Stamp (DTS) indicating the display time and decoding time of a corresponding picture.

Figure 15:
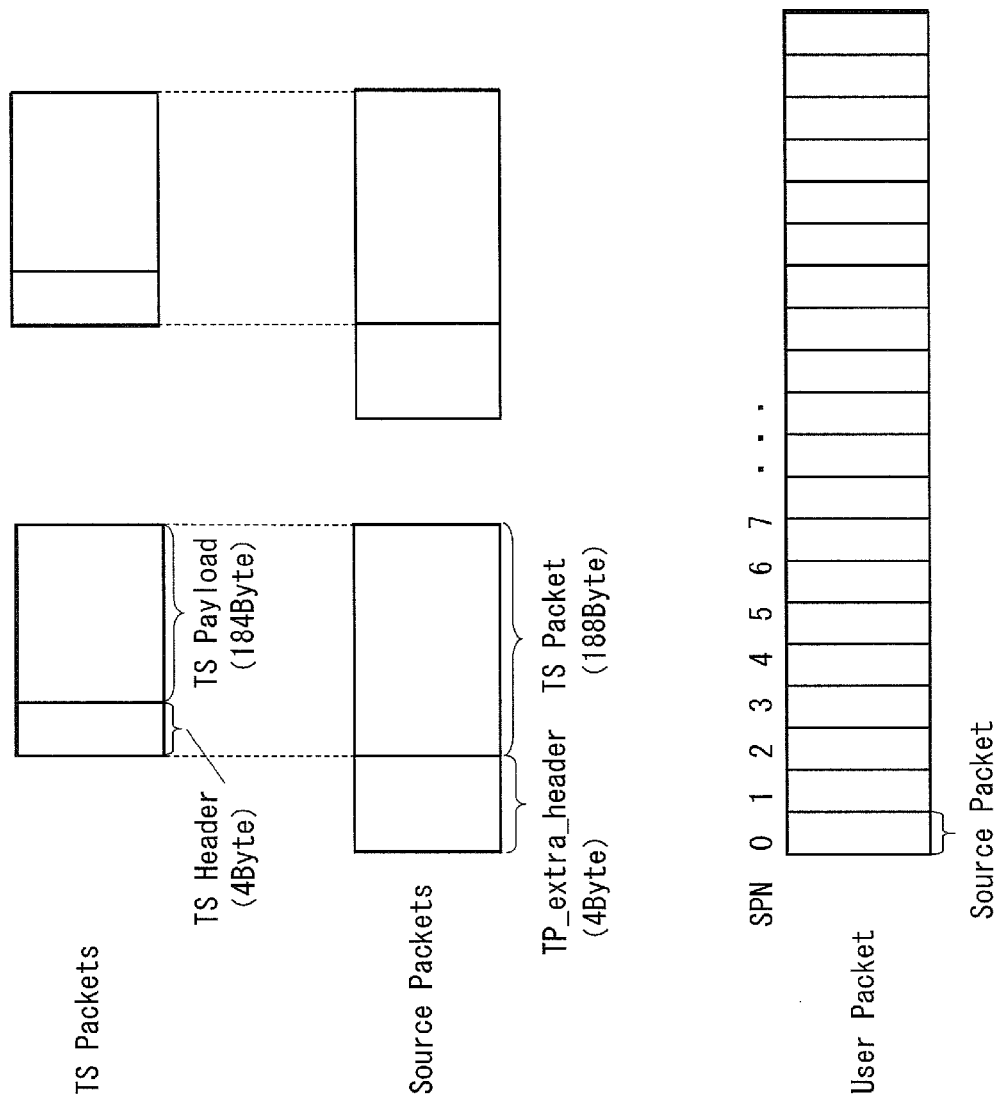
FIG. 15 is a schematic drawing illustrating the format of a TS packet and a source packet present in multiplexed data.

FIG. 15 illustrates the format of a TS packet to be eventually loaded to a transport stream. The TS packet is a fixed length packet of 188 bytes and has a 4-byte TS header containing such information as PID identifying the stream and a 184-byte TS payload carrying actual data. The PES packets described above are divided to be stored into the TS payloads of TS packets. In the case of BD-ROM, each TS packet is attached with a TP extra header of 4 bytes to build a 192-byte source packet, which is to be loaded to a transport stream. The TP extra header contains such information as arrival time stamp (ATS). The ATS indicates a time for starring transfer of the TS packet to the PID filter of a decoder. As shown on the lowest tier in FIG. 15, a transport stream includes a sequence of source packets each bearing a source packet number (SPN), which is a number incrementing sequentially from the start of the transport stream.

In addition to the TS packets storing streams such as video, audio, and PG streams, a transport stream also includes TS packets storing a Program Association Table (PAT), a Program Map Table (PMT), and a Program Clock Reference (PCR). The PAT in a transport stream indicates the PID of a PMT used in the transport stream, and the PID of the PAT is "0". The PMT includes PIDs identifying the respective streams, such as video, audio and subtitles, contained in a transport stream and attribute information (frame rate, aspect ratio, and so on) of the streams identified by the respective PIDs. In addition, the PMT includes various types of descriptors relating to the transport stream. One of such descriptors may be copy control information indicating whether or not copying of the transport stream is permitted. The PCR includes information for synchronizing the Arrival Time Clock (ATC), which is the time axis of ATS, with the System Time Clock (STC), which is the time axis of PTS and DTS. More specifically, the PCR packet includes information indicating an STC time corresponding to the ATS at which the PCR packet is to be transferred.

Figure 16:
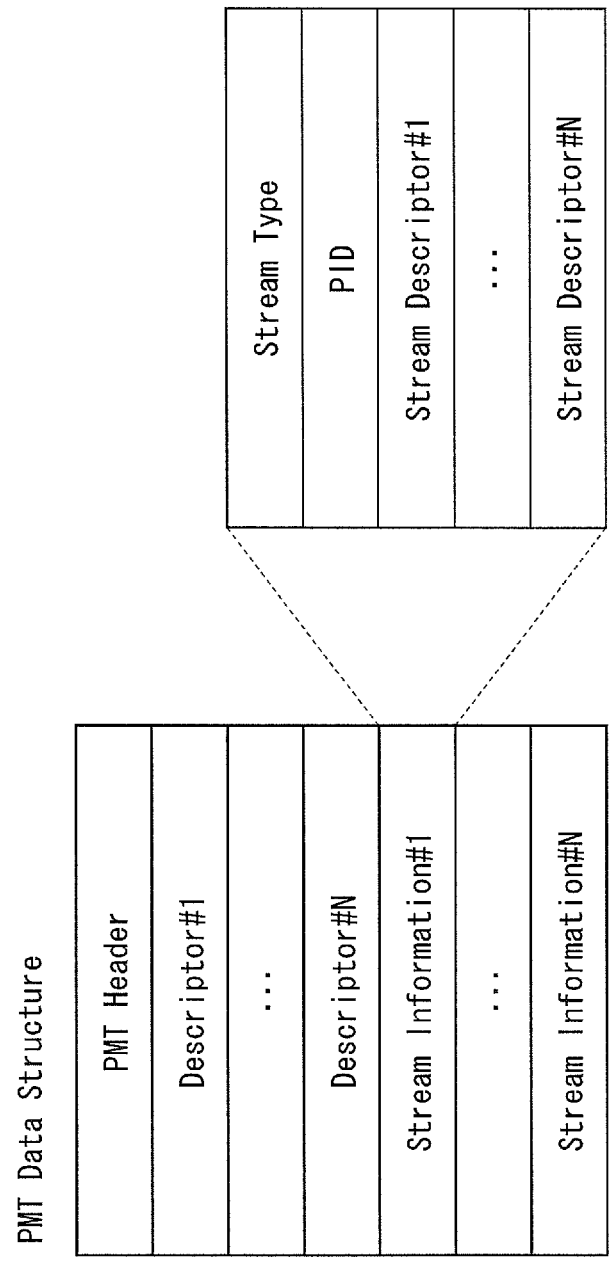
FIG. 16 is a schematic drawing illustrating the structure of PMT data.

FIG. 16 is a view illustrating the data structure of PMT in detail. The PMT starts with a PMT header indicating the length of data contained in the PMT. Following the PMT header, descriptors relating to the transport stream are disposed. One example of a descriptor included in the PMT is copy control information described above. Following the descriptors, pieces of stream information relating to the respective streams included in the transport stream are arranged. Each piece of stream information is composed of stream descriptors indicating a stream type identifying a compression codec employed for a corresponding stream, a PID of the stream, and attribute information (frame rate, aspect ratio, and the like) of the stream. The PMT includes as many stream descriptors as the number of streams included in the transport stream.

When recorded onto a recoding medium, for example, the transport stream is recorded along with a transport stream information file.

Figure 17:
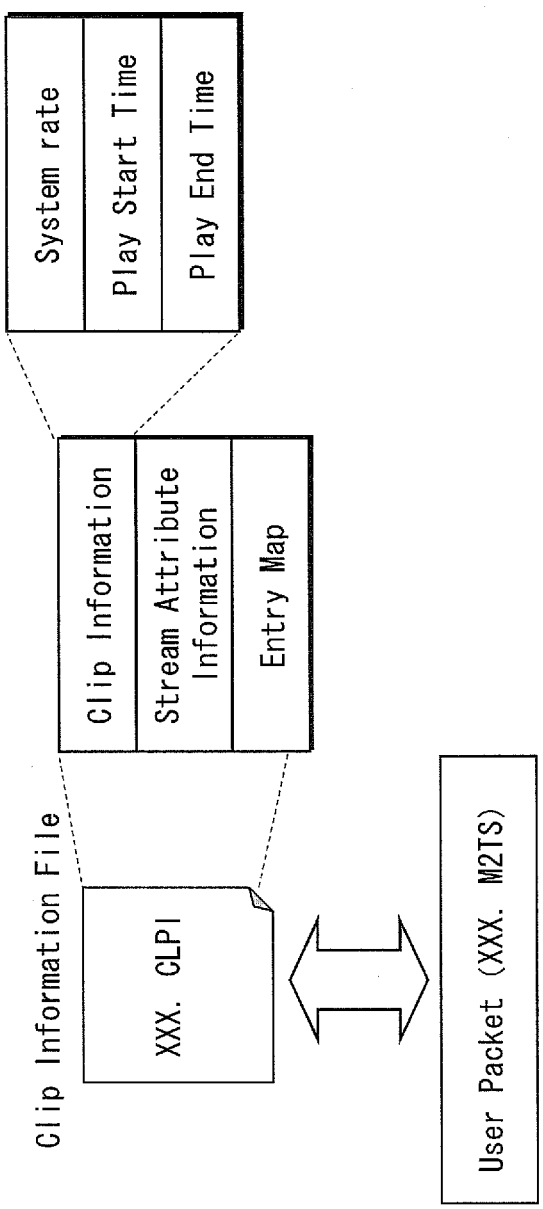
FIG. 17 is a schematic drawing illustrating the internal structure of multiplexed data.

FIG. 17 is a view illustrating the structure of the transport stream information file. As illustrated in FIG. 17, the transport stream information file is management information of a corresponding transport stream and composed of transport stream information, stream attribute information and an entry map. Note that transport stream information files and transport streams are in a one-to-one relationship.

As illustrated in FIG. 17, the transport stream information is composed of a system rate, playback start time, and playback end time. The system rate indicates the maximum transfer rate of the transport stream to the PID filter of a system target decoder, which will be described later. The transport stream includes ATSs at intervals set so as not to exceed the system rate. The playback start time is set to the time specified by the PTS of the first video frame in the transport stream, whereas the playback end time is set to the time calculated by adding the playback period of one frame to the PTS of the last video frame in the transport stream.

Figure 18:
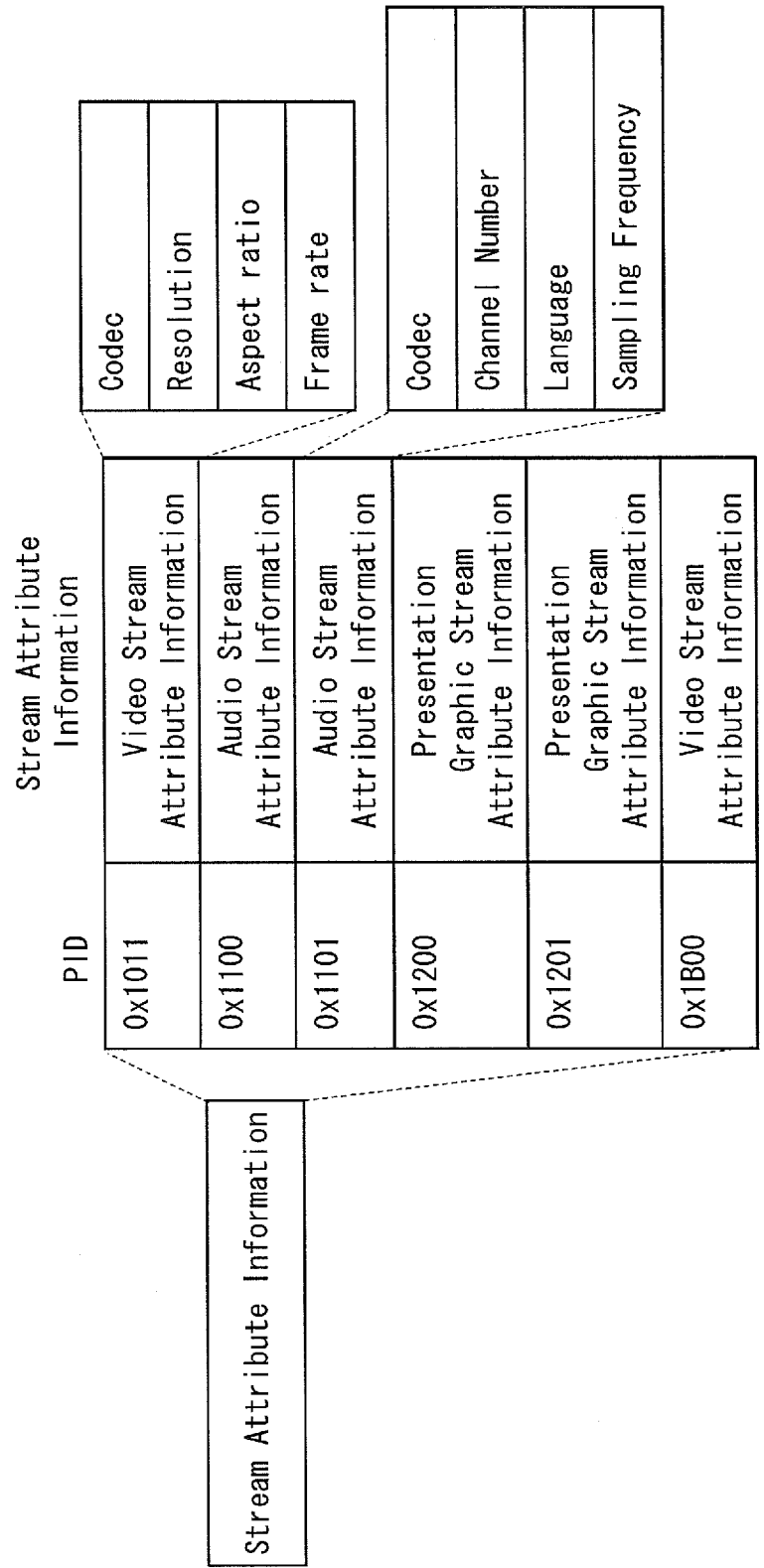
FIG. 18 is a schematic drawing illustrating the internal structure of stream attribute information.

FIG. 18 illustrates the structure of stream attribute information contained in a transport stream information file. As illustrated in FIG. 18, the stream attribute information includes pieces of attribute information of the respective streams included in a transport stream and each attribute information is registered with a corresponding PID. That is, different pieces of attribute information are provided for different streams, namely a video stream, an audio stream, a PG stream and an IG stream. The video stream attribute information indicates the compression codec employed to compress the video stream, the resolutions of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. These pieces of information are used to initialize a decoder before playback by a player.

In the present embodiment, from among the pieces of information included in the user packet information file, the stream type included in the PMT is used. In the case where the user packet is recorded on a recording medium, the video stream attribute information included in the user packet information file is used. More specifically, the moving picture coding method and device described in any of the above embodiments may be modified to additionally include a step or unit of setting a specific piece of information in the stream type included in the PMT or in the video stream attribute information. The specific piece of information is for indicating that the video data is generated by the moving picture coding method and device described in the embodiment. With the above structure, video data generated by the moving picture coding method and device described in any of the above embodiments is distinguishable from video data compliant with other standards.

Figure 19:
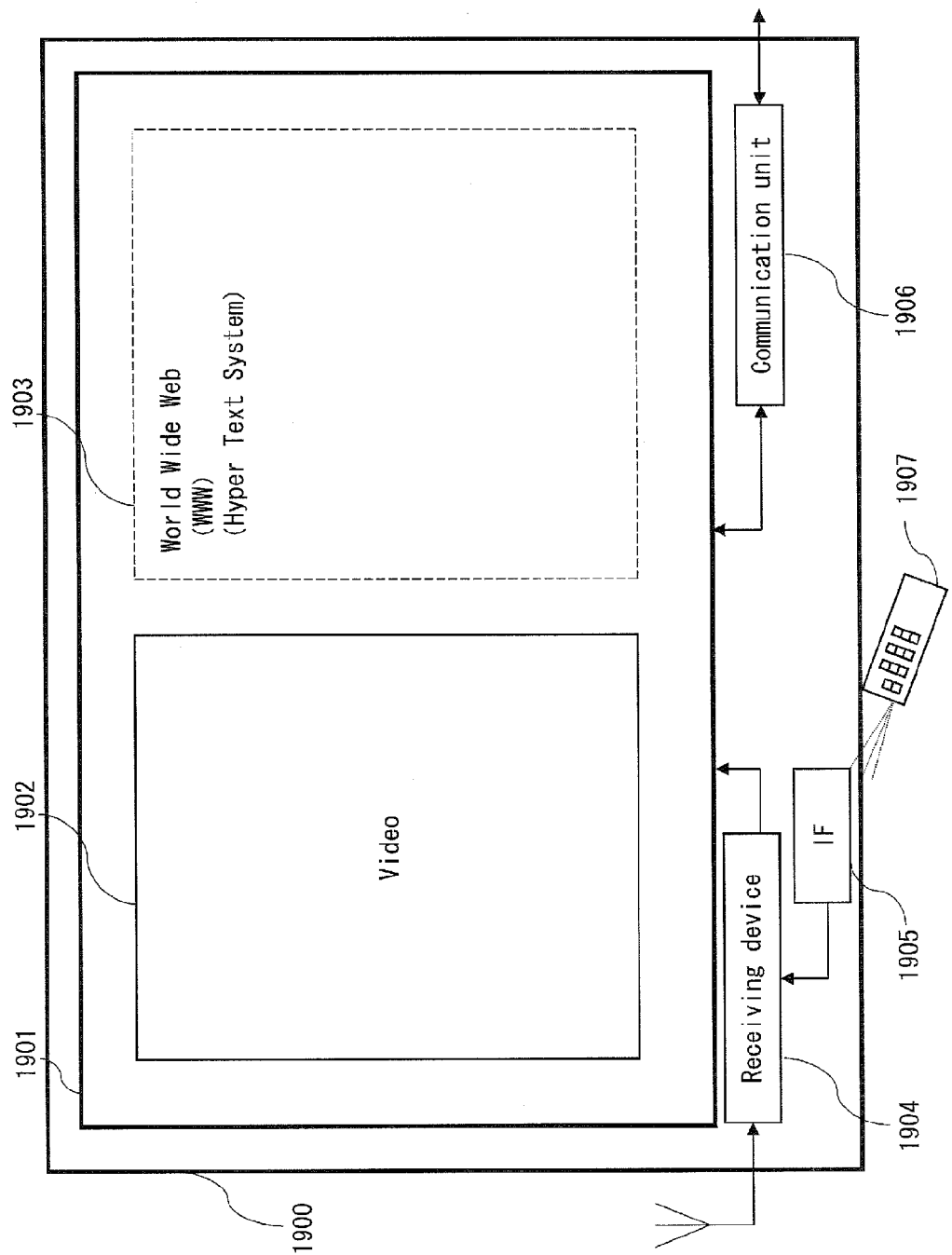
FIG. 19 is a schematic drawing illustrating an example of the structure of video display and audio output device.

FIG. 19 illustrates an exemplary structure of a video and audio output device 1900 that includes a receiving device 1904 for receiving a modulated signal carrying video and audio data or data for data broadcasting from a broadcasting station (base station). Note that the structure of the receiving device 1904 is basically same as the receiving device 1100 illustrated in FIG. 11. The video and audio output device 1900 is installed with an Operating System (OS), for example, and also with a communication unit 1906 (a device for wireless Local Area Network (LAN) or Ethernet (registered trademark), for example) for establishing Internet connection. With this structure, hypertext (World Wide Web (WWW)) 1903 provided over the Internet can be displayed on a display area 1901 simultaneously with images 1902 reproduced on the display area 1901 from the video and audio data or data provided by data broadcasting. By operating a remote control (which may be a mobile phone or keyboard) 1907, the user can make a selection on the images 1902 reproduced from data provided by data broadcasting or the hypertext 1903 provided over the Internet to change the operation of the video and audio output device 1900. For example, by operating the remote control to make a selection on the hypertext 1903 provided over the Internet, the user can change the WWW site currently displayed to another site. Alternatively, by operating the remote control 1907 to make a selection on the images 1902 reproduced from the video or audio data or data provided by the data broadcasting, the user can transmit information indicating the selected channel (such as selected broadcast program or audio broadcasting). In response, an interface (IF) 1905 acquires information transmitted from the remote control 1907, so that the receiving device 1904 operates to obtain reception data by demodulation and error correction of a signal carried on the selected channel. At the time of data reception, the receiving device 1904 receives control symbols containing information indicating a transmission method of a signal carried on the selected channel, so that the information indicative of the transmission method is obtained. With the information, the receiving device 1904 is enabled to make appropriate settings for the receiving operation, demodulation method, and error correction method to duly receive transport streams transmitted from a broadcast station (base station). Although the above description is directed to an example in which the user selects a channel using the remote control 1907, the same description applies to an example in which the user selects a channel using a selection key provided on the video and audio output device 1900.

In addition, the video and audio output device 1900 may be operated via the Internet. For example, a terminal connected to the Internet is used to make settings on the video and audio output device 1900 for pre-programmed recording (storing). (The video and audio output device 1900 therefore has the recording unit 1108 as illustrated in FIG. 11). Before starting the pre-programmed recording, the video and audio output device 1900 selects the channel, so that the receiving device 1904 operates to obtain reception data by demodulation and error correction of a signal carried on the selected channel. At the time of data reception, the receiving device 1904 receives control symbols containing information indicating a transmission method of a signal carried on the selected channel, so that the information indicative of the transmission method is obtained. With the information, the receiving device 1904 is enabled to make appropriate settings for the receiving operation, demodulation method, and error correction method to duly receive transport streams transmitted from a broadcast station (base station).

Summarizing, the present invention provides a reversible compression mechanism for compressing a header of a transport stream packet for transmission in a digital broadcast network. In particular, a physical layer pipe for transmitting the transport stream packet is selected in accordance with the packet identifier of the transport stream packet and the packet identifier of the transport stream packet is replaced with a short packet identifier which indicates at least whether the transport stream packet is a NULL packet.

INDUSTRIAL APPLICABILITY

The present invention provides a reversible compression mechanism for compressing a header of a transport stream packet for transmission in a digital broadcast network, and is accordingly efficient in increasing the transmission efficiency in a digital broadcast network

REFERENCE SIGNS LIST

110 TS packet
120 TS packet header
121 synchronization byte (sync byte)

122 transport error indicator
123 payload unit start indicator
124 transport priority
125 packet identifier (PID)
126 transport scrambling control
127 adaptation field control
128 continuity counter
130 TS packet payload
201 TS packet
210 demultiplexer
220 physical layer pipe processing
230 frame mapping
240 modulation
250 input processing
260 forward error correction (FEC) encoding
270 constellation mapping
280 interleaving
301 data burst
302 portion of baseband packet payload
303 baseband frame
320 baseband frame header
330 remainder
340 baseband packet payload
350 padding
410 NULL packet
500 compressed header
510 NULL-packet indicator
520 duplicated packet indicator
600a transmitter
600b receiver
601 stream of transport stream packet
610 extracting unit
620 header compression unit
630 demultiplexer (DEMUX)
640 physical layer processing unit
650 transmitting unit
660 receiving unit
670 physical layer processing unit
680 extracting unit
690 header deriving unit
691 TS packet
695 header decompression unit
710 transmitter
715 transmitting station
730 personal computer (PC)
740 set top box (STB)
750 TV
760 TV with receiver
800 transmitter
810 demultiplexer (DEMUX)
820 L1 signaling processing
830 frame mapping
910 P1 signaling
920 L1-pre signaling
930 L1-post signaling
1000 receiver
1010 physical layer processing unit
1020 L1 signaling processing
1030 merge unit
1100 receiving device
1101 tuner
1102 demodulation unit
1103 stream input/output unit
1104 signal processing unit
1105 AV output unit
1106 audio output unit
1107 video display unit
1108 recording unit
1109 stream output IF
1110 operation input unit
1111 AV output IF
1130, 1140 transport medium
1150 remote control
1160 antenna
1301 video stream
1302, 1305, 1312, 1315 PES packet sequence
1303, 1306, 1313, 1316 TS packet sequence
1304 audio stream
1311 presentation graphic (PG) stream
1314 interactive graphic (IG) stream
1317 transport stream
1900 video and audio output device
1901 display area
1902 images
1903 hypertext
1904 receiving device
1905 interface (IF)
1906 communication unit
1907 remote control

The invention claimed is:

1. A method for transmitting a data stream in a physical layer frame, the data stream including transport stream packets, each of the transport stream packets being a data packet or a NULL packet,
wherein the data stream includes groups of data packets, each of the data packets having a header including a packet identifier, and each of the groups of data packets consisting of a plurality of data packets containing user data and having a same value for a single packet identifier,
the method being performed using a processor, and the method comprising:
mapping the groups of data packets to a plurality of physical layer pipes, the plurality of physical layer pipes including one or more physical layer pipes with header compression to which only one group of data packets is mapped;
for each of the physical layer pipes with header compression, (i) generating a group of header compressed data packets from the group of data packets mapped to the physical layer pipe by replacing the packet identifier in each of the data packets of the group of data packets mapped to the physical layer pipe with a NULL packet identifier indicating whether or not a transport stream packet is a NULL packet that does not contain user data, the NULL packet identifier being a single bit, which is less than the number of bits of the replaced packet identifier and (ii) generating packet identification information indicating the same value of the replaced packet identifier of the group of data packets mapped to the physical layer pipe; and
transmitting the physical layer frame for each of the physical layer pipes with header compression, the physical layer frame including the packet identifier information and the group of header compressed data packets or including the packet identifier information, the group of header compressed data packets, and the NULL packet with header compression having the header including the NULL packet identifier.

2. The method according to claim 1, wherein
the plurality of physical layer pipes includes one or more physical layer pipes without header compression, and the physical layer frame further includes the group of data packets, each having the header including a value of a packet identifier, mapped to the physical layer pipe without header compression.

3. The method according to claim 1, wherein the header of each of the data packets further includes a four-bit length continuity counter that indicates a sequence number of the data packet, and the method further comprises replacing, to generate each of the header compressed data packets in the group of header compressed data packets, the continuity counter in the header of the data packet with a one-bit duplicated packet indicator indicating whether the data packet is a repetition of a previously processed packet.

4. The method according to claim 1, wherein the header of each of the data packets further includes an error indicator for indicating whether the data packet has an error, and the method further comprises deleting, to generate each of the header compressed data packets in the group of header compressed data packets, the error indicator from the header of the data packet to generate the header compressed data packet.

5. An apparatus for transmitting a data stream in a physical layer frame, the data stream including transport stream packets that are each a data packet or a NULL packet, wherein the data stream includes groups of data packets, each of the data packets having a header including a packet identifier, and each of the groups of data packets consisting of a plurality of data packets containing user data and having a same value for a single packet identifier, the apparatus comprising:

a processor; and a non-transitory memory storing thereon a program, which when executed by the processor, cause the processor to:

map the groups of data packets to a plurality of physical layer pipes, the plurality of physical layer pipes including one or more physical layer pipes with header compression to which only one group of data packets is mapped;

for each of the physical layer pipes with header compression, (i) generate a group of header compressed data packets from the group of data packets mapped to the physical layer pipe by replacing the packet identifier in each of the data packets of the group of data packets mapped to the physical layer pipe with a NULL packet identifier indicating whether or not a transport stream packet is a NULL packet that does not contain user data, the NULL packet identifier being a single bit, which is less than the number of bits of the replaced packet identifier and (ii) generate packet identification information indicating the same value of the replaced packet identifier of the group of data packets mapped to the physical layer pipe; and transmit the physical layer frame for each of the physical layer pipes with header compression, the physical layer frame including the packet identifier information and the group of header compressed data packets or including the packet identifier information, the group of header compressed data packets, and the NULL packet with header compression having the header including the NULL packet identifier.

\* \* \* \* \*